United States Patent
Sethumadhavan et al.

(10) Patent No.: US 9,996,694 B2
(45) Date of Patent: Jun. 12, 2018

(54) UNSUPERVISED DETECTION OF ANOMALOUS PROCESSES USING HARDWARE FEATURES

(71) Applicant: THE TRUSTEES OF COLUMBIA UNIVERSITY IN THE CITY OF NEW YORK, New York, NY (US)

(72) Inventors: Lakshminarasimhan Sethumadhavan, New York, NY (US); Adrian Tang, New York, NY (US); Salvatore Stolfo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days. days.

(21) Appl. No.: 14/778,043

(22) PCT Filed: Mar. 14, 2014

(86) PCT No.: PCT/US2014/027375
§ 371 (c)(1),
(2) Date: Sep. 17, 2015

(87) PCT Pub. No.: WO2014/152469
PCT Pub. Date: Sep. 25, 2014

(65) Prior Publication Data
US 2016/0275289 A1    Sep. 22, 2016

Related U.S. Application Data

(60) Provisional application No. 61/919,560, filed on Dec. 20, 2013, provisional application No. 61/803,029, filed on Mar. 18, 2013.

(30) Foreign Application Priority Data

Nov. 5, 2013   (WO) ................ PCT/US2013/068451

(51) Int. Cl.
*H04L 9/00* (2006.01)
*G06F 21/56* (2013.01)
(Continued)

(52) U.S. Cl.
CPC .......... *G06F 21/566* (2013.01); *G06F 21/552* (2013.01); *G06N 99/005* (2013.01);
(Continued)

(58) Field of Classification Search
CPC combination set(s) only.
See application file for complete search history.

(56) References Cited

U.S. PATENT DOCUMENTS 7,590,880 B1   9/2009   Hershman
7,657,941 B1   2/2010   Zaitsev
(Continued)

FOREIGN PATENT DOCUMENTS

EP       2141626       1/2010

OTHER PUBLICATIONS

Office Action, Chinese Application No. 2013800766921, dated May 4, 2017.
(Continued)

*Primary Examiner* — Josnel Jeudy
(74) *Attorney, Agent, or Firm* — Occhiuti & Rohlicek LLP

(57) ABSTRACT

Disclosed are devices, systems, apparatus, methods, products, media and other implementations, including a method that includes obtaining current hardware performance data, including hardware performance counter data, for a hardware device executing a first process associated with pre-recorded hardware performance data representative of the first process' normal behavior, and determining whether a malicious process is affecting performance of the first process based on a determination of an extent of deviation of the
(Continued)

obtained current hardware performance data corresponding to the first process from the pre-recorded hardware performance data representative of the normal behavior of the first process.

14 Claims, 14 Drawing Sheets

(51) Int. Cl.
  *G06F 21/55* (2013.01)
  *G06N 99/00* (2010.01)
  *H04L 9/32* (2006.01)
  *H04L 29/06* (2006.01)

(52) U.S. Cl.
  CPC ........ *H04L 9/3239* (2013.01); *H04L 63/0428* (2013.01); *G06F 2221/034* (2013.01)

(56) References Cited

U.S. PATENT DOCUMENTS

| | | |
|---|---|---|
| 7,801,837 B2 | 9/2010 | Chang et al. |
| 8,074,115 B2 | 12/2011 | Stolfo et al. |
| 8,229,726 B1 | 7/2012 | Ramsay et al. |
| 9,369,433 B1 | 6/2016 | Paul et al. |
| 2003/0070087 A1 | 4/2003 | Grayaznov et al. |
| 2007/0294768 A1 | 12/2007 | Moskovitch et al. |
| 2008/0184371 A1 | 7/2008 | Moskovitch et al. |
| 2008/0189530 A1 | 8/2008 | McIntosh et al. |
| 2009/0300765 A1 | 12/2009 | Moskovitch et al. |
| 2011/0041179 A1 | 2/2011 | Stahlberg |
| 2011/0228926 A1 | 9/2011 | Shumow et al. |
| 2011/0238855 A1 | 9/2011 | Korsunsky et al. |
| 2011/0247071 A1 | 10/2011 | Hooks et al. |
| 2012/0254641 A1 | 10/2012 | Rotem et al. |
| 2012/0266244 A1 | 10/2012 | Green et al. |
| 2012/0297057 A1 | 11/2012 | Ghosh et al. |
| 2014/0223553 A1 | 8/2014 | Gupta et al. |
| 2016/0275288 A1 | 9/2016 | Sethumadhavan |

OTHER PUBLICATIONS

Office Action, Chinese Application No. 2014800287531, dated Jun. 1, 2017.
Notice to File a Response, Korean Application No. 10-2015-7027779, dated May 12, 2017.
Azab et al., "SICE: A Hardware-Level Strongly Isolated Computing Environment for x86 Multi-core Platforms", Proceedings of the 18th ACM Conference on Computer and Communications Security, Oct. 17-21, 2011, pp. 375-388.
Bailey et al., "Automated Classification and Analysis of Internet Malware", Proceedings of the 10th International conference on Recent Advances in Intrusion Detection, Apr. 26, 2007, University of Michigan.
Catuogno et al., "A *Format-Independent* Architecture for Run-Time Integrity Checking of Executable Code", Proceedings of the 3rd International Conference on Security in Communication Networks 2002.
Christodorescu et al., "Mining Specifications of Malicious Behavior", Proceedings of the 6th Joint Meeting of the European Software Engineering Conference and the ACM SIGSOFT Symposium on the Foundations of Software Engineering, Sep. 3-7, 2007, pp. 5-14.
Hildebrandt, "A computer architecture with hardwarebased malware detection", 2010 International Conference on Availability, Reliability, and Security, Feb. 15-18, 2010, pp. 41-45, Helmut-Schmidt-Univ. Hamburg, Germany.
Hypponen, "Malware goes mobile", Scientific American, Nov. 2006, pp. 70-77.
Jana et al., "Abusing File Processing in Malware Detectors for Fun and Profit", 2012 IEEE Symposium on Security and Privacy, pp. 80-94, The University of Texas at Austin.

Lee et al., "A Data Mining Framework for Building Intrusion Detection Models", Proceedings of the 1999 IEEE Symposium on Security and Privacy, pp. 120-132.
Moir, Security MVP, "Defining Malware: FAQ", Microsoft Technet Library, Oct. 2003 [retrieved on Jan. 17, 2017] Retrieved from the Internet: <URL: http://technet.microsoft.com/en-us/library/dd632948(d=printer).aspx>.
Notice to File a Response, Korean Application No. 10-2015-7027779, dated Oct. 19, 2016.
Notification of Transmittal of the International Search Report and the Written Opinion of the International Searching Authority, or the Declaration, International Search Report, and Written Opinion, PCT/US2013/068451, dated May 2, 2014.
Notification of Transmittal of the International Search Report and the Written Opinion of the International Searching Authority, or the Declaration, International Search Report, and Written Opinion, PCT/US2014/027375, dated Aug. 8, 2014.
Petroni, et al., "Copilot—a Coprocessor-based Kernel Runtime Integrity Monitor", Proceedings of the 13th USENIX Security Symposium, San Diego, CA, Aug. 9-13, 2004, vol. 13.
Tahan et al., "Automatic Malware Detection using Common Segment, Analysis and Meta-Features", Journal of Machine Learning Research 13 (2012). [retrieved on Jul. 9, 2014] Retrieved from the Internet: <URL: http://jmlr.org/papers/volume13/tahan12a/tahan12a.pdf>, pp. 949-979.
Borello and L. Mé, "Code obfuscation techniques for metamorphic viruses," Journal in Computer Virology, vol. 4, No. 3, pp. 211-220, 2008.
Bruschi, L. Cavallaro, and A. Lanzi, "An efficient technique for preventing mimicry and impossible paths execution attacks," in Performance, Computing, and Communications Conference, 2007. IPCCC 2007. IEEE Internationa. IEEE, 2007, pp. 418-425.
Clark, B. Ransford, A. Rahmati, S. Guineau, J. Sorber, K. Fu, and W. Xu, "WattsUpDoc: Power Side Channels to Nonintrusively Discover Untargeted Malware on Embedded Medical Devices," in USENIX Workshop on Health Information Technologies, Aug 2013.
Fewer, S., "Reflective DLL injection," Oct. 2008.
Forrest, S, A, Hofmeyr, A. Somayaji, and T. A. Longstaff, "A sense of self for unix processes," in Security and Privacy, 1996. Proceedings., 1996 IEEE Symposium on. IEEE, 1996, pp. 120-128.
Hoffmann, S. Neumann, and T. Holz, "Mobile malware detection based on energy fingerprints—a dead end?" in Research in Attacks, Intrusions, and Defenses. Springer, 2013, pp. 348-368.
Hofmeyr, S. Forrest, and A. Somayaji, "Intrusion detection using sequences of system calls," Journal of computer security, vol. 6, No. 3, pp. 151-180, 1998.
Hoste and L. Eeckhout, "Comparing Benchmarks Using Key Microarchitecture-independent Characteristics," in Workload Characterization, 2006 IEEE International Symposium on. IEEE, Oct. 2006, pp. 83-92.
Kayaalp, T. Schmitt, J. Nomani, D. Ponomarev, and N. B. Abu-Ghazaleh, "Scrap: Architecture for signature-based protection from code reuse attacks." in HPCA, 2013, pp. 258-269.
Kim, J. Smith, and K. G. Shin, "Detecting energy-greedy anomalies and mobile malware variants," in Proceedings of the 6th international conference on Mobile systems, applications, and services, ACM, 2008, pp. 239-252.
Kong, D. Tian, P. Liu, and D. Wu, "Sa3: Automatic semantic aware attribution analysis of remote exploits," in Security and Privacy in Communication Networks, Springer, 2012, pp, 190-208.
Krügel, T. Toth, and E. Kirda, "Service specific anomaly detection for network intrusion detection," in Proceedings of the 2002 ACM symposium on Applied computing. ACM, 2002, pp. 201-208.
Mahoney, "Network traffic anomaly detection based on packet bytes," in Proceedings of the 2003 ACM symposium on Applied computing. ACM, 2003, pp. 346-350.
Malone, M. Zahran, and R. Karri, "Are hardware performance counters a cost effective way for integrity checking of programs," in Proceedings of the sixth ACM workshop on Scalable trusted computing, ser. STC '11. New York, NY, USA: ACM, 2011, pp, 71-76.

(56) References Cited

OTHER PUBLICATIONS

Marceau, "Characterizing the behavior of a program using multiplelength n-grams," in Proceedings of the 2000 workshop on New security paradigms. ACM, 2001, pp. 101-110.

Pappas, M. Polychronakis, and A. D. Keromytis, "Transparent rop exploit mitigation using indirect branch tracing," in Proceedings of the 22nd USENIX conference on Security, ser. SEC'13. Berkeley, CA, USA: USENIX Association, 2013, pp. 447-462.

Peisert, M. Bishop, S. Karin, and K. Marzullo, "Analysis of computer intrusions using sequences of function calls," Dependable and Secure Computing, IEEE Transactions on, vol. 4, No. 2, pp. 137-150, 2007.

Polychronakis, K. G. Anagnostakis, and E. P. Markatos, "Emulationbased detection of non-self-contained polymorphic shellcode," in Recent Advances in Intrusion Detection, Springer, 2007, pp, 87-106.

Polychronakis, K, G. Anagnostakis, and E. P. Markatos, "Comprehensive shellcode detection using runtime heuristics," in Proceedings of the 26th Annual Computer Security Applications Conference. ACM, 2010, pp. 287-296.

Schölkopf, J. C. Platt, J. C. Shawe-Taylor, A. J. Smola, and R. C. Williamson, "Estimating the support of a high-dimensional distribution," Neural Comput., vol. 13, No. 7, pp. 1443-1471, Jul. 2001.

Sekar, M. Bendre, D. Dhurjati, and P. Bollineni, "A fast automatonbased method for detecting anomalous program behaviors," in Security and Privacy, 2001, S&P. 2001. Proceedings. 2001 IEEE Symposium on. IEEE, 2001, pp. 144-155.

Sethumadhavan, Simha, Salvatore J. Stolfo, Angelos Keromytis, Junfeng Yang, and David August: "The sparchs project: Hardware support for software security." In SysSec Workshop (SysSec), 2011 First, pp. 119-122. IEEE, 2011.

Shen, M. Zhong, S, Dwarkadas, C, Li, C. Stewart, and X. Zhang, "Hardware counter driven on-the-fly request signatures," in Proceedings of the 13th international conference on Architectural support for programming languages and operating systems, ser. ASPLOS XIII. New York, NY, USA: ACM, 2008, pp. 189-200.

Somayaji, S. Forrest, "Automated response using system-call delays," in Proceedings of the 9th USENIX Security Symposium, vol. 70, 2000.

Stewin, "A primitive for revealing stealthy peripheral-based attacks on the computing platform's main memory," in Research in Attacks, intrusions, and Defenses. Springer, 2013, pp. 1-20.

Szor, the art of computer virus research and defense. Pearson Education, 2005.

TrendMicro, "The crimeware evolution," http://www.trendmicro.com/cloud-content/us/pdfs/security-intelligence/white-papers/wp-the-crimeware-evolution.pdf, 2012.

Wang, J. J. Parekh, and S. J. Stoifo, "Anagram: A content anomaly detector resistant to mimicry attack," in Recent Advances in Intrusion Detection. Springer, 2006, pp, 226-248,.

Wang and R. Karri, "Numchecker: detecting kernel control-flow modifying rootkits by using hardware performance counters," in Proceedings of the 50th Annual Design Automation Conference, ser. DAC '13. New York, NY, USA: ACM, 2013, pp. 79:1-79:7.

Xia, Y. Liu, H. Chen, and B. Zang, "CFIMon: Detecting violation of control flow integrity using performance counters," Proceedings of the 2012 42nd Annual IEEE/IFIP International Conference on Dependable Systems and Networks (DSN), ser. DSN '12. Washington, DC, USA: IEEE Computer Society, 2012, pp. 1-12.

Yuan, W. Xing, H. Chen, and B. Zang, "Security breaches as pmu deviation: detecting and identifying security attacks using performance counters,"in APSys, 2011, p. 6.

Bayer et al., "Scalable, behavior-based malware clustering," in NDSS, 2009.

Caballero et al., "Measuring Pay-per-Install: The commoditization of malware distribution," in Proceedings of the 20th USENIX Security Symposium, Aug. 2011.

Chien, L. OMurchu, and N. Falliere, "W32.Duqu: The Precursor to the Next Stuxnet," in Proceedings of the 5th USENIX Workshop on Large-Scale Exploits and Emergent Threats (LEET), San Jose, CA, USA, Apr. 2012 chkrootkit. 2008, Apr. [Online]. Available: http://freecode.com/projects/chkrootkit.

Corelan Team, "Corelan ROPdb," Jul. 2011. https://www.corelan.be/index.php/security/corelan-ropdb/.

Demme, M. Maycock, J. Schmitz, A. Tang, A. Waksman, S. Sethumadhavan, and S. Stolfo, "On the feasibility of online malware detection with performance counters," in Proceedings of the 40th Annual International Symposium on Computer Architecture, ser. ISCA '13. New York, NY, USA: ACM, 2013, pp. 559-570.

Gonzalez and J. H. Reed, "Detecting unauthorized software execution in SDR using power fingerprinting," in Military Communications Conference, 2010-MILCOM 2010. IEEE, 2010, pp. 2211-2216.

Henning, "Spec cpu2006 benchmark descriptions," SIGARCH Comput. Archit. News, vol. 34, No. 4, pp. 1-17, Sep. 2006.1.

Isci, G. Contreras, and M. Martonosi, "Live, runtime phase monitoring and prediction on real systems with application to dynamic power management," in Proceedings of the 39th Annual IEEE/ACM International Symposium on Microarchitecture, ser. MICRO 39. Washington, DC, USA: IEEE Computer Society, 2006, pp. 359-370.

Laboratory of Cryptography and System Security (CrySyS Lab), "sKy-Wiper: A Complex Malware for Targeted Attacks," http://www.crysys.hu/skywiper/skywiper.pdf, Budapest University of Technology and Economics, Tech. Rep. v1.05, May 2012.

Lanzi et al., "Accessminer: using system-centric models for malware protection," in Proceedings of the 17th ACM conference on Computer and communications security, ser. CCS'10. New York, NY, USA: ACM, 2010, pp. 399-412.

Matias, Linux rootkit implementation. Dec. 2011 [online] Available: http://average-coder.blogspot.com/2011/12/linux-rootkit.html.

Osvik, A. Shamir, and E. Tromer, "Cache attacks and countermeasures: the case of aes," in Proceedings of the 2006 The Cryptographers' Track at the RSA conference on Topics in Cryptology, ser. CT-RSA'06. Berlin, Heidelberg: Springer-Verlag, 2006, pp. 1-20.

Rieck et al., "Learning and classification of malware behavior," in Proceedings of the 5th international conference on Detection of Intrusions and Malware, and Vulnerability Assessment, ser. DIMVA '08. Berlin, Heidelberg: Springer-Verlag, 2008, pp. 108-125.

The rootkit hunter project. May 2012 [Online]. Available: http://rkhunter.sourceforge.net/.

Sherwood et al., "Discovering and exploiting program phases," Micro, IEEE, vol. 23 No. 6, pp. 84-93, Nov.-Dec. 2003.

Sherwood, S. Sair, and B. Calder, "Phase tracking and prediction," in Proceedings of the 30th annual international symposium on Computer architecture, ser. ISCA '03. New York, NY, USA: ACM, 2003, pp. 336-349.

Stone-Gross et al., "The underground economy of fake antivirus software," in Economics of Information Security and Privacy III, B. Schneier, Ed. Springer New York, 2013, pp. 55-78.

Ször and P. Ferrie, "Hunting for metamorphic," in in Virus Bulletin Conference, 2001, pp. 123-144.

Ször, The art of computer virus research and defense. Pearson Education, 2005.

Trend Micro Corporation, "Russian underground 2.0." Feb. 5, 2018.

Zhou and X. Jiang, "Dissecting android malware: Characterization and evolution,"in Security and Privacy (SP), 2012 IEEE Symposium on, May 2012, pp. 95-109.

Duda, P. E. Hart, and D. G. Stork, "Pattern Classification, New York: John Wiley & Sons, 2001, pp. xx + 654, isbn: 0-471-05669-3," J. Classif., vol. 24, No. 2, pp. 305-307, Sep. 2007.

Zhang Guang-hui,Shen Jian-mai,Nie Zhen-long,Wang Jin-zhe,Yan Ming-jiang,Hao Ming-liang, "Theory and methodology of regional groundwater function and sustainable utilization assessment in China" Institute of Hydrogeology and Environmental Geology, CAGS, Shijiazhuang 050061 China, Apr. 2006: pp. 161-185. [English Abstract Included].

| Name | Event Description |
|---|---|
| Architectural Events | |
| LOAD | Load instructions retired |
| STORE | Store instructions retired |
| ARITH | Arithmetic instructions retired |
| BR | Branch instructions retired |
| CALL | All near call instructions retired |
| CALL_D | Direct near call instructions retired |
| CALL_ID | Indirect near call instructions retired |
| RET | Near return instructions retired |
| Microarchitectural Events | |
| LLC | Last level cache references |
| MIS_LLC | Last level cache misses |
| MISP_BR | Mispredicted branch instructions |
| MISP_RET | Mispredicted near return instructions |
| MISP_CALL | Mispredicted near call instructions |
| MISP_BR_C | Mispredicted conditional branch instructions |
| MIS_ICACHE | I-Cache misses |
| MIS_ITLB | I-TLB misses |
| MIS_DTLBL | D-TLB load misses |
| MIS_DTLBS | D-TLB store misses |
| STLB_HIT | Shared-TLB hits after i-TLB misses |
| %MIS_LLC | % of last level cache misses |
| %MISP_BR | % of mispredicted branches |
| %MISP_RET | % of mispredicted near return instructions |

FIG. 3

| Exploit Stage | Set Label | Events ranked by F-scores ||||||||
|---|---|---|---|---|---|---|---|---|---|
| | | 1 | 2 | 3 | 4 | 5 | 6 | 7 | 8 |
| | | Architectural Events ||||||||
| ROP | A-0 | RET | CALL_D | STORE | ARITH | CALL | LOAD | CALL_ID | BR |
| Stage1 | A-1 | STORE | LOAD | CALL_ID | RET | CALL_D | CALL | ARITH | BR |
| Stage2 | A-2 | STORE | CALL_ID | RET | CALL_D | CALL | ARITH | BR | LOAD |
| | | Microarchitectural Events ||||||||
| ROP | M-0 | MISP_BR_C | %MISP_BR | MISP_BR | %MISP_RET | MIS_ITLB | MIS_LLC | MIS_DTLBS | MISP_CALL |
| Stage1 | M-1 | MISP_RET | MISP_BR_C | %MISP_RET | %MISP_BR | MIS_DTLBS | STLB_HIT | MISP_BR | MIS_ICACHE |
| Stage2 | M-2 | MISP_RET | STLB_HIT | MIS_ICACHE | MIS_ITLB | %MISP_RET | MISP_CALL | MIS_LLC | MISP_BR_C |
| | | Both Architectural and Microarchitectural Events ||||||||
| ROP | AM-0 | MISP_BR_C | %MISP_BR | MISP_BR | %MISP_RET | MIS_ITLB | RET | MIS_LLC | MIS_DTLBS |
| Stage1 | AM-1 | STORE | LOAD | MISP_RET | CALL_ID | RET | CALL_D | CALL | MISP_BR_C |
| Stage2 | AM-2 | STORE | CALL_ID | MISP_RET | RET | CALL_D | CALL | STLB_HIT | MIS_ICACHE |

FIG. 4

| Scenario Label | Non-Temporal | | | Temporal | |
|---|---|---|---|---|---|
| | ROP | Stage1 | Stage2 | Stage1 | Stage2 |
| L-1core | 0.505 | 0.895 | 0.814 | 0.918 | 0.900 |
| L-2core | 0.496 | 0.890 | 0.807 | 0.907 | 0.813 |
| R-1core | 0.678 | 0.916 | 0.781 | 0.995 | 0.823 |

FIG. 11A

| Set Label | Non-Temporal | | | Temporal | |
|---|---|---|---|---|---|
| | ROP | Stage1 | Stage2 | Stage1 | Stage2 |
| AM-0 | 0.931 | 0.861 | 0.504 | 0.967 | 0.766 |
| AM-1 | 0.857 | 0.932 | 0.786 | 0.999 | 0.863 |
| AM-2 | 0.907 | 0.939 | 0.756 | 0.998 | 0.912 |

FIG. 11B

UNSUPERVISED DETECTION OF ANOMALOUS PROCESSES USING HARDWARE FEATURES

CROSS-REFERENCE TO RELATED APPLICATIONS

This application claims the benefit of, and priority to, International Application No. PCT/US2014/027375, entitled "UNSUPERVISED ANOMALY-BASED MALWARE DETECTION USING HARDWARE FEATURES," and filed Mar. 14, 2014, which claims the benefit of, and priority to, U.S. Provisional Patent Application No. 61/919,560, entitled "UNSUPERVISED ANOMALY-BASED MALWARE DETECTION USING HARDWARE FEATURES," and filed Dec. 20, 2013, International Patent Application No. PCT/US2013/068451, entitled "DETECTION OF ANOMALOUS PROGRAM EXECUTION USING HARDWARE-BASED MICRO-ARCHITECTURAL DATA," and filed Nov. 5, 2013 in the United States receiving office, and U.S. provisional application Ser. No. 61/803,029, entitled "SYSTEMS AND METHODS TO DETECT ANOMALOUS PROGRAM EXECUTION USING PROCESSOR MICROARCHITECTURAL EVENTS," and filed Mar. 18, 2013, the contents of all of which are incorporated herein by reference in their entireties.

STATEMENT REGARDING FEDERALLY SPONSORED RESEARCH

This invention was made with government support under FA 8750-10-2-0253 awarded by the Air Force Research Laboratory, Information Directorate. The government has certain rights in the invention.

BACKGROUND

Malicious processes, such as malware infections, have plagued organizations and users for years, and are growing stealthier and increasing in number by the day. These malicious processes were originally created to attain notoriety or for fun, but today malware deployment is mostly motivated by economic gains. There are reports of active underground markets for personal information, credit cards, logins into sensitive machines in the United States, etc. Also, malicious processes, such as malware processes, have been developed to target specific computers for espionage purposes (industrial espionage or otherwise) and/or for sabotage.

Despite the existence of anti-virus software, malware threats (as well as threats from other types of malicious processes) persist and are growing. Unfortunately, there are numerous ways to subvert commercial anti-virus software, including simply disabling the anti-virus system. Furthermore, malware can mutate into new variants, which makes static detection of malware difficult.

SUMMARY

The devices, systems, apparatus, methods, products, media and other implementations disclosed herein include a method that includes obtaining current hardware performance data, including hardware performance counter data, for a hardware device executing a first process associated with pre-recorded hardware performance data representative of the first process' normal behavior, and determining whether a malicious process is affecting performance of the first process based on a determination of an extent of deviation of the obtained current hardware performance data corresponding to the first process from the pre-recorded hardware performance data representative of the normal behavior of the first process.

Embodiments of the method may include at least some of the features described in the present disclosure, including one or more of the following features.

Obtaining the hardware performance data may include obtaining the hardware performance data at various time instances. Obtaining the hardware performance data at the various time instances may include performing one or more of, for example, a data push operation initiated by the hardware device to send the current hardware performance data, and/or a data pull operation, initiated by an antivirus engine, to cause the current hardware performance data to be sent by the hardware device.

Obtaining the current hardware performance data may include selecting one or more features, from a plurality of hardware performance features, based on respective computed one or more scores representative of a degree of effectiveness a corresponding subset of hardware performance data for the corresponding one of the one or more features can indicate that the hardware performance data obtained for the selected one or more features is affected by the malicious process, and obtaining performance data from the current hardware performance data only for the selected one or more features.

Computing the one or more scores may include computing one or more Fisher scores.

Determining whether the malicious process is affecting the performance of the first process may include applying one or more machine-learning procedures, trained using the pre-recorded hardware performance data representative of the normal behavior of the first process, to the current hardware performance data to determine whether the current hardware performance data for the hardware device executing the first process deviates from the pre-recorded hardware performance data for the first process.

The one or more machine learning procedures may include one or more of, for example. a support vector machine implementing a non-linear radial basis function (RBF) kernel, a k-nearest neighbor procedure, a decision tree procedure, a random forest procedure, an artificial neural network procedure, a tensor density procedure, and/or a hidden Markov model procedure.

The method may further include applying a transform function to at least the current hardware performance data to generate transformed data. Determining whether the malicious process is affecting the performance of the first process may include determining whether the malicious process is affecting the performance of the first process based on the extent of deviation of the current hardware performance data from the pre-recorded hardware performance data computed using the generated transformed data.

Applying the transform function to the at least the current hardware performance data to generate transformed data may include deriving a normalized hardware performance value, normalized$_i$, for an event i, from hardware performance data value, raw$_i$, for the event i, according to:

$$\text{normalized}_i = \left(\frac{\text{raw}_i - \text{min}_i}{\text{max}_i}\right)^{\lambda_i}$$

where $\min_i$ and $\max_i$ are respective minimum and maximum values for the event i, and $\lambda_i$ is a power parameter for the event i.

The hardware performance data may include one or more of, for example, processor load density data, branch prediction performance data, and/or data regarding instruction cache misses.

The method may further include obtaining updates for at least the pre-recorded hardware performance data representative of the normal behavior of the first process. Obtaining the updates may include downloading encrypted data for the updates to an antivirus engine in communication with the hardware device providing the current hardware performance data, decrypting at the antivirus engine the downloaded encrypted data for the updates, and updating a revision counter maintained by the antivirus engine indicating a revision number of a most recent update.

In some variations, a system is disclosed that includes a hardware device executing a first process, and an antivirus engine in communication with the hardware device. The antivirus engine is configured to obtain current hardware performance data, including hardware performance counter data, for the hardware device executing the first process, the first process associated with pre-recorded hardware performance data representative of the first process' normal behavior, and determine whether a malicious process is affecting performance of the first process based on a determination of an extent of deviation of the obtained current hardware performance data corresponding to the first process from the pre-recorded hardware performance data representative of the normal behavior of the first process.

Embodiments of the system may include at least some of the features described in the present disclosure, including at least some of the features described above in relation to the method, as well as one or more of the following features.

The antivirus engine configured to obtain the current hardware performance data may be configured to select one or more features, from a plurality of hardware performance features, based on respective computed one or more scores representative of a degree of effectiveness a corresponding subset of hardware performance data for the corresponding one of the one or more features can indicate that the hardware performance data obtained for the selected one or more features is affected by the malicious process, and obtain performance data from the current hardware performance data only for the selected one or more features.

The antivirus engine configured to determine whether the malicious process is affecting the performance of the first process may be configured to apply one or more machine-learning procedures, trained using the pre-recorded hardware performance data representative of the normal behavior of the first process, to the current hardware performance data to determine whether the current hardware performance data for the hardware device executing the first process deviates from the pre-recorded hardware performance data for the first process.

The antivirus engine may further be configured to apply a transform function to at least the current hardware performance data to generate transformed data. The antivirus configured to determine whether the malicious process is affecting the performance of the first process may be configured to determine whether the malicious process is affecting the performance of the first process based on the extent of deviation of the current hardware performance data from the pre-recorded hardware performance data computed using the generated transformed data.

In some variations, a computer readable media storing a set of instructions executable on at least one programmable device is provided. The set of instructions, when executed, causes operations including obtaining current hardware performance data, including hardware performance counter data, for a hardware device executing a first process associated with pre-recorded hardware performance data representative of the first process' normal behavior, and determining whether a malicious process is affecting performance of the first process based on a determination of an extent of deviation of the obtained current hardware performance data corresponding to the first process from the pre-recorded hardware performance data representative of the normal behavior of the first process.

Embodiments of the computer readable media may include at least some of the features described in the present disclosure, including at least some of the features described above in relation to the method and the system.

In some variations, an apparatus is provided. The apparatus includes means for obtaining current hardware performance data, including hardware performance counter data, for a hardware device executing a first process associated with pre-recorded hardware performance data representative of the first process' normal behavior, and means for determining whether a malicious process is affecting performance of the first process based on a determination of an extent of deviation of the obtained current hardware performance data corresponding to the first process from the pre-recorded hardware performance data representative of the normal behavior of the first process.

Embodiments of the apparatus may include at least some of the features described in the present disclosure, including at least some of the features described above in relation to the method, the system, and the computer readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

FIG. 3 is a table listing some example events or features that may be monitored to facilitate determination of processes' deviation from their normal behavior.

FIG. 4 is a table listing events by their F-scores for different exploit process stages.

FIGS. 11A-B include tables of AUC scores for various scenarios.

Like reference symbols in the various drawings indicate like elements.

DESCRIPTION

Described herein are methods, systems, devices, apparatus, computer program products, media, and other implementations for unsupervised detection of anomalous behavior of executing programs/processes by determining deviation from the normal behavior of legitimate (i.e., non-malicious) programs and processes. In some implementations, hardware performance data, including hardware performance counter data (e.g., from hardware-based performance counters) is obtained from a hardware device (such as a processor/computing-based device on which the legitimate processes and programs are executing), and the data is analyzed using machine-learning procedures (e.g., classification procedures), to determine whether the collected hardware performance data deviates from normal, previously obtained, hardware performance data resulting from normal execution of such legitimate programs or processes.

While the description provided herein focuses on malware-type malicious processes that result in anomalous behavior of legitimate programs, application and processes, the description also applies to other types of malicious processes.

Figure 1:
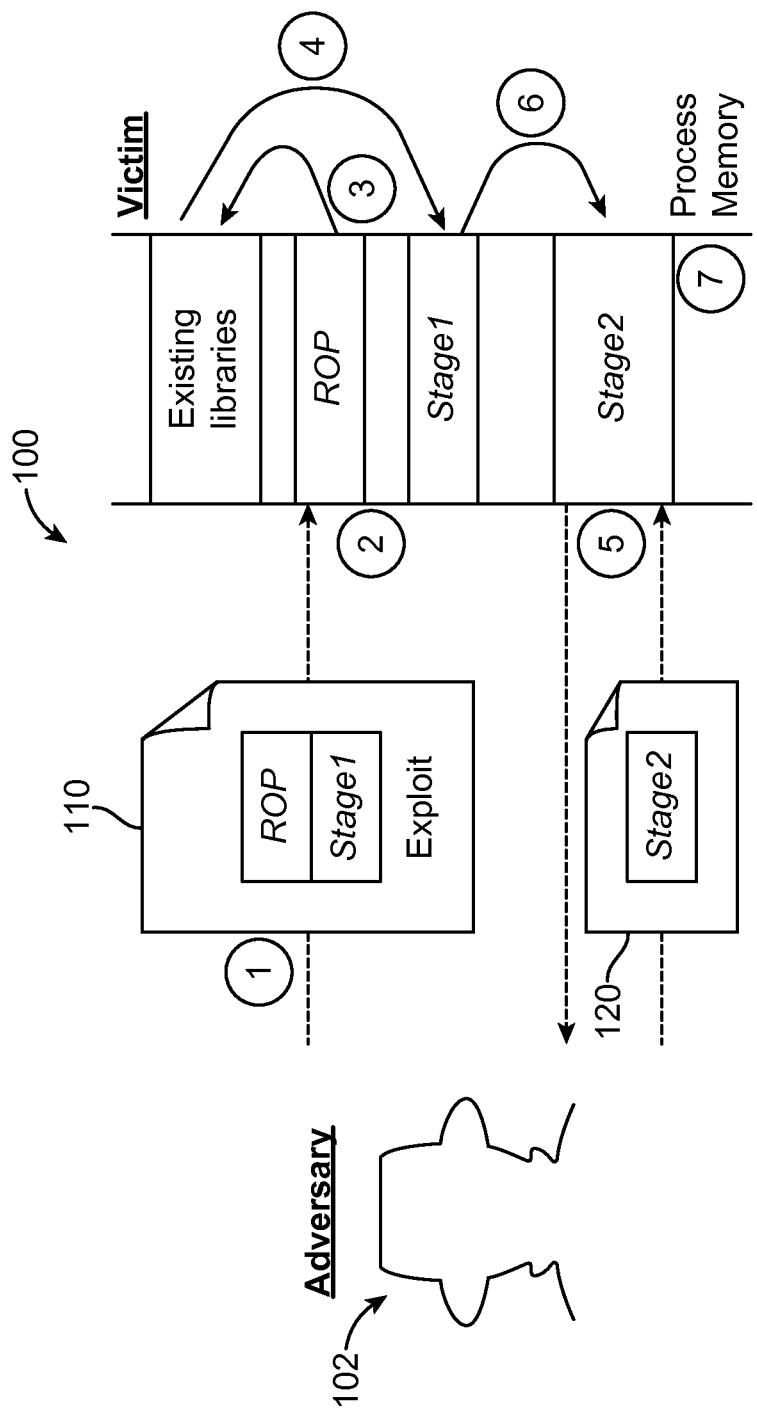
FIG. 1 is a diagram illustrating a multi-stage malware infection process.

A typical malware infection can be understood as a two stage process, namely, exploitation and take-over. During the exploitation stage, the malicious process hijacks control of a victim program execution. Exploitation is then followed by more elaborate procedures to download and install a payload such as a keylogger. More particularly, with reference to FIG. 1, a diagram illustrating a multi-stage malware infection process 100 is shown. In implementing the process 100, an adversary 102 first crafts and delivers an exploit, such as an exploit 110 depicted in FIG. 1, to the victim to target a specific vulnerability known to the adversary (marked as operation '1' in FIG. 1). The vulnerability may be, in some embodiments, a memory corruption bug, and the exploit may be sent to a victim from a webpage or a document attachment from an email. When the victim accesses the exploit, two exploit subprograms, commonly known as the ROP (Return-Oriented Programming, which is a computer security exploit technique to enable circumvention of security features), and Stage 1 "shellcodes," of the exploit 110 load into the memory of the vulnerable program (marked as operation '2' in FIG. 1). The exploit 110 then uses the vulnerability to transfer control to the ROP shellcode (operation '3' of FIG. 1).

To prevent untrusted data being executed as code, some modern processors provide a Data Execution Prevention (DEP) module to prevent code from being run from data pages. A problem with the DEP module is that it can be toggled by the program itself (this feature is necessary to support JIT compilation). Thus, to circumvent DEP, the ROP-stage shellcode may re-use instructions in the original program binary to craft a call to the function that disables DEP for the data page containing the next Stage1 shellcode of the exploit 110. The ROP shellcode then redirects execution to the next stage (as shown in operation '4' of FIG. 1). The Stage1 shellcode is typically a relatively small (from a few bytes to about 300 bytes 2) code stub configured to download a larger (and generally pernicious) payload (depicted in FIG. 1 as Stage2 Payload 120) which can be run more freely. To maintain stealth, the Stage2 payload 120 is downloaded to memory (as illustrated in operation '5' of FIG. 1). The Stage2 Payload 120 include the code that the adversary 102 wants to execute on the user machine to perform a specific malicious task. The range of functionality of this payload, commonly a backdoor, keylogger, or reconnaissance program, is in fact unlimited. After the payload is downloaded, the Stage1 shellcode runs that payload as an executable using, for example, reflective DLL injection (as illustrated at operation '6' of FIG. 1), which is a stealthy library injection technique that does not require any physical files. By this time, the victim system is compromised (as indicated in operation '7' of FIG. 1).

The Stage1 shellcode of the exploit 110 and the Stage2 Payload 120 are generally different in terms of size, design and function, primarily due to the operational constraints on the Stage1 shellcode. When delivering the initial shellcode in the exploit 110, exploit writers typically try to use as little memory as possible to ensure that the program does not unintentionally overwrite their exploit code in memory. To have a good probability for success this code needs to be small and fast, and thus is written, in some implementations, in assembly in very restrictive position-independent memory addressing style. These constraints may limit the attackers' ability to write very large shellcodes. In contrast, the Stage2 Payload 120 does not have all these constraints and can be developed like any regular program. This is similar to how OSes use small assembly routines to bootstrap and then switch to compiled code.

The strategy and structure described above is representative of a large number of malware processes, especially those created with fairly recent web exploit kits. These malware exploits execute from memory and in the process context of the host victim program. Further, they maintain disk and process stealth by ensuring no files are written to disk and no new processes are created, and can thus evade many file-based malware detection techniques.

Detecting malware during the exploitation stage may not only give more lead time for mitigations, but can also act as an early threat predictor to improve the accuracy of subsequent signature-based detection of payloads. Anti-malware implementations for anomaly-based detection, such as the implementations described herein, are based on the observation that the malware, during the exploitation stage, alters the original program flow to execute peculiar non-native code in the context of the victim program. Such unusual code execution will generally cause perturbations to dynamic execution characteristics of the program, and if these perturbations are observable they can form the basis for the detection of malware exploits. It should be noted that because exploits manipulate execution flow within the victim programs, signature-based detection paradigm may not be appropriate to detect exploitations. For instance, a signature-based detector would likely correctly report that IE is executing even when it is infected with malware because the malware resides within IE.

In some embodiments, it is possible that deviations caused by exploits may be fairly small and unreliable, especially in vulnerable programs with varied use such as, for example, Internet Explorer, Adobe PDF Reader (as will be described in greater detail below, in the testing and experimentation of the implementations described herein, Internet Explorer 8 and Adobe PDF Reader 9 were used). For example, on a production Windows machine running on Intel x86 chips, testing and experimentation indicated that distributions of execution measurements from the hardware performance counters can be positively skewed, with many values being clustered near zero. This implies that minute deviations caused by the exploit code cannot be effectively discerned directly. However, the problem of identifying deviations from the heavily skewed distributions can be alleviated by, for example, using power transform (as will be discussed in greater details below) to amplify small differences, together with temporal aggregation of multiple samples, to set apart the execution of the exploit within the context of the larger program execution.

Accordingly, in some embodiments, methods, systems, devices, apparatus, products, media, and other implementations are disclosed that include a system including a hardware device executing a first process, and an antivirus engine to detect, prevent and/or remove malicious software and/or firmware (including malware such as viruses, worms, rootkits, etc.), with the antivirus engine being in communication with the hardware device. The antivirus engine is configured to obtain current hardware performance data, including hardware performance counter data, for the hardware device executing the first process, with the first process being associated with pre-recorded hardware performance data representative of the first process' normal behavior. The antivirus engine is further configured to determine whether a malicious process is affecting performance of the first process based on a determination of an extent of deviation of the obtained current hardware performance data corresponding to the first process from the pre-recorded hardware performance data representative of the normal behavior of the first process.

Figure 2:
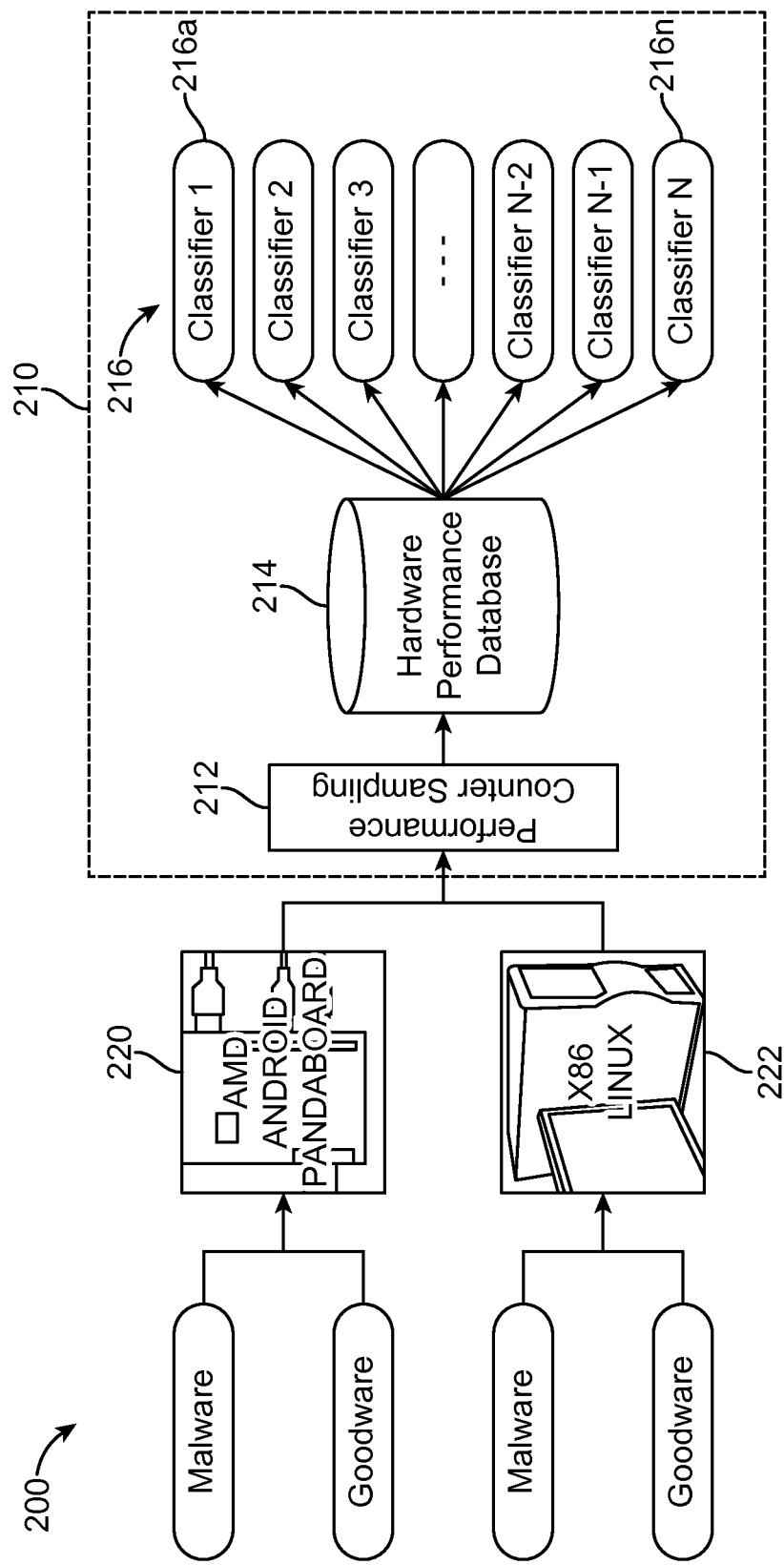
FIG. 2 is a schematic diagram of an example implementation of a system to determine whether a malicious process is present and is affecting the performance of a victim process.

Thus, with reference to FIG. 2, a schematic diagram of an example implementation of a system 200 configured to determine whether a malicious process is present and is affecting the performance of a victim process is shown. The system 200 includes an antivirus (AV) engine 210 that comprises, in some embodiments, a performance counter sampling unit (also referred to as a "sampler") 212, a hardware performance database 214 that stores/maintains representative baseline hardware performance data corresponding to normal behavior for various processes that are normally executed on the hardware device to be monitored, and may also store hardware performance data (e.g., organized as vectors) collected by the sampling unit 212, and a classifier 216 (which may comprise multiple individual, and possibly independent, classifiers 216*a-n*) configured to analyze the collected hardware performance data to determine if a particular process is infected (and thus impacted) by a malicious process (in some embodiments, the classifier 216 may also be configured to more particularly identify the malicious process affecting the performance of the victim process monitored). The AV engine 210 is generally in communication with one or more hardware devices such as processor devices 220 and/or 222 shown in FIG. 2. As will be discussed in greater details below, the AV 210 may be implemented entirely in software, entirely in hardware (e.g., as dedicated circuits implemented on a hardware device, such as a processor, running the legitimate processes/programs being monitored), or as a hardware/software combination with at least part of the AV's implementation (e.g., the sampling unit) being realized as a dedicated hardware circuit (e.g., on the hardware device running the legitimate processes/programs).

The sampling unit 212 is configured to obtain hardware performance data, including, for example, hardware performance counter data, from the one or more hardware-devices, which may include devices such as controller devices, e.g., processor devices such as the devices 220 and 222, or any other type of controller devices including controller devices implemented using modules such as an FPGA (field programmable gate array), an ASIC (application-specific integrated circuit), a DSP processor, etc. Generally, hardware-based controller devices include hardware-related performance counters that may be configured to count a variety of events, such as cycles, instructions, cache misses, etc., occurring during execution of processes and programs on one of the devices 220 and 222. Legitimate programs or processes, such as Internet Explorer, Adobe Reader, etc., may have had their performances, as reflected by the hardware-related performance counters implemented on the devices 220 and 222, deviate from their normal performance due to exploitation by malware infecting the devices 220 and 222. For example, the Intel For x86 processor device implements four (4) configurable performance counters, and the OMAP4460 processor with dual ARM Cortex-A9 cores includes six (6) configurable performance counters. The AV engine 210 is implemented to obtain hardware performance data (e.g., performance counter data) from known controller designs, and as such the AV engine 210 may be configured to obtain hardware performance data from specific known performance counters particular to the hardware that is being monitored by the AV engine. That is, knowledge of the specific architecture of the hardware to be monitored may be required in order to obtain hardware performance data from the performance counters corresponding to the specific architecture. Examples of hardware performance counters used on an Intel x86 processor architecture include:

0x0440—LID_CACHE_LD.E_STATE;
    0x0324—L2_RQSTS.LOADS;
    0x03b1—UOPS_EXECUTED.PORT (1 or 2); and
    0x7f88—BR_INST_EXEC.ANY.

Examples of common counters (feature event number assignments) on an ARM Cortex-A9 cores architecture, through which hardware performance data can be obtained, include event numbers:

0x06—Memory-reading instruction architecturally executed (counter increments for every instruction that explicitly read data);
    0x07—Memory-writing instruction architecturally executed (counter increments for every instruction that explicitly wrote data);
    0x0C—Software change of PC, except by an exception, architecturally executed (counter does not increment for a conditional instruction that fails its condition code);
    0x0D—Immediate branch architecturally executed (counter counts for all immediate branch instructions that are architecturally executed);
    0x0F—Unaligned access architecturally executed (counter counts each instruction that is an access to an unaligned address); and
    0x12—Counter counts branch or other change in program flow that could have been predicted by the branch prediction resources of the processor.

Additional information on hardware performance counters that may be implemented, or are available, on the ARM Cortex-A9 cores architecture is provided, for example, at "ARM® Architecture Reference Manual, Arm® v7-A and ARM® v7-R edition, Errata markup," the content of which is incorporated herein by reference in its entirety.

In some embodiments, the sampling unit 212 may be configured to obtain hardware performance data (including micro-architectural performance counter data) from the counters of the hardware monitored through data push procedures and/or through data pull procedures. For example, when pulling data, the AV engine 210 initiates the data collection, causing hardware targets (e.g., specific hardware performance counters implemented in the hardware being monitored) to be accessed by, for example, interrupting execution of the counters and/or querying the counters without interruptions. In some embodiments, the AV engine 210 may be configured, e.g., via the sampling module 212, to interrupt the hardware once every N cycles (where N may be a constant pre-determined number, or may be a varying number, e.g., based on a random or pseudo-random generator), and sample the various performance/event counters, as well as other values (e.g., the currently executing process' PID). When performing sampling operations using an interrupt-based procedure, the sampling unit 212 may be configured to send control signals or otherwise cause the executing hardware to be interrupted, access the performance counters and/or other storage hardware, and retrieve the values stored on the counters of the interrupted hardware for further processing by the AV engine 210. In some embodiments, upon interruption of the hardware and/or the counters, the interrupted hardware may first store data held by its various performance counters in a central storage location (e.g., in a state stack), and the data stored at the central storage location may then be accessed and retrieved by the sampling unit 212. When implementing a data-push sampling mode, data held by the performance counters (and/or other sampling points on the hardware being monitored) may be communicated to the AV engine 210 (e.g., to the sampling unit 212) at regular or irregular intervals, with or without interrupting the execution of the hardware being monitored or interrupting execution of the performance counters. Thus, in such embodiments, the hardware device to be monitored is configured to initiate sending the hardware performance data to the AV engine 210. For example, in a data push mode, the hardware device being monitored may be configured to send hardware performance data without needing to receive a request (e.g., from the sampling unit 212).

The sampling operations implemented by the sampling unit 212 of the AV engine 210 can thus obtain time-based data of the output of the various hardware performance counters (and/or other output points) monitored for one or more processes executing on the hardware being monitored. In addition to hardware performance data, information such as a process' ID (e.g., PID) is also recorded to enable associating/correlating the hardware performance data with the process whose execution resulted in the obtained hardware performance data. By also recording processes' IDs and associating/correlating them with the obtained hardware performance data, the implementations described herein can track hardware performance data resulting from execution of a process across different hardware devices. For example, in situations where a system being monitored includes multiple processor cores (each with its own set of performance counters), where processes/threads may be suspended and resume execution on different cores, maintaining processes' PID's along with obtained hardware performance data may enable tracking the behavior of processes as they switch execution to different hardware devices.

While the processors used to execute the various programs whose behavior is to be monitored enable monitoring numerous events using Hardware Performance Counters (HPC's) and/or other mechanisms to collect hardware performance data, not all of those monitored events are equally useful in characterizing the execution of programs. Thus, in some embodiments, only a limited set of monitored events needs to be used to determine, for example, whether a victim process' behavior/performance is deviating from its normal behavior/performances. FIG. 3 provides a table 300 listing some example events that may be monitored (e.g., using HPC's) to facilitate determination of processes' deviation from their normal behavior. The example events listed in the table 300 include architectural events, which give an indication of the execution mix of instructions in any running program, and micro-architectural events that are generally dependent on the specific hardware makeup of a system.

In some embodiments, a processor may be capable of monitoring only a small number of events (e.g., 4 events) at any given time. Thus, in such embodiments, it may be necessary to select a subset of events available for monitoring that can most effectively differentiate clean execution of a program/process from an infected execution of that program/process. The selection of this subset may be made from those events previously identified as being useful in characterizing execution of the programs (e.g., identifying an initial set of events, from the sometimes hundreds of possible events that can be monitored through, for example, a processor's HPC's, that are useful in characterizing execution of programs/processes). In some embodiments, Fisher Scores (F-Score) may be used to provide a quantitative measure of the how effective a feature can discriminate between hardware performance data (also referred to as "measurements") obtained during clean execution of a program/process monitored, from measurements obtained during infected execution of that program/process. A feature with better discriminative power would have a larger separation between the means and standard deviations for samples from different classes. The F-Score gives a measure of this degree of separation. The larger the F-Score, the more discriminative power the feature is likely to have. While the F-Score may not account for mutual information/dependence between features, the F-Score may nevertheless help guide the selection of a subset of the possibly most useful features that can be used to determine whether hardware performance data for those feature indicates possible infected execution (i.e., execution impacted by an activated malware) of the program/process being monitored.

Thus, in some implementations, to identify which events are to be monitored in order to obtain data samples (that are then used to determine whether the sampled/monitored behavior of a legitimate program or process has deviated from its normal behavior), corresponding F-Scores for various candidate events are computed. As illustrated in a table 400 in FIG. 4, in some embodiments, F-Scores may be computed for the different stages of malware code execution (e.g., the stages depicted in FIG. 1), and thus reduce the shortlisted events to, for example, the eight (8) top-ranked events for each of the two event categories (e.g., architectural events and micro-architectural events) per malware code execution stage, as well as for the two categories combined. Accordingly, as shown in FIG. 4, each row of the table 400 ranks the various events for a particular category of events at a particular stage of malware code execution, thus enabling determining which events would be most useful to differentiate clean execution for a victim program/process from execution of the infected victim program/process. For example, row 410 is the ranking of architectural events, according to computed F-Scores for those events, during the ROP stage of some malware code execution. In some embodiments, the top four (4) events from each row may be selected to produce nine (9) candidate event sets that we will be used to build the baseline characteristics models of a particular program or process (e.g., an IE browser). For example, as shown in the row 410 of the table 400, for the ROP stage, the 4-top ranked architectural events may include, in this example, the RET, CALL_D, STORE, and ARITH events. Each model constructed with one set of events can then be evaluated for its effectiveness in the detection of various stages of malware code execution.

Data sampling may be performed by obtaining hardware performance data sample that include simultaneous measurements of, in some embodiments, four event counts in one time epoch. Thus, in such embodiments, four counter values may be obtained during each epoch, with the categories/labels determined based on, for example, offline sensitivity analysis. The measurements in each sample may be converted to vector subspace, so that each classification vector is represented as a four-feature vector. Each vector, using this feature extraction process, represents the measurements taken at the smallest time-slice for the sampling granularity. These features can be used to build non-temporal models. Because malware shellcode typically runs over several time epochs, there may be temporal relationships in the measurements that can be exploited. To model any potential temporal information, the dimensionality of each sample vector can be extended by grouping N consecutive samples and combining the measurements of each event to form a vector with 4N features. In some implementations, the value N (representative of the period, in epochs, over which measurements are taken) may be set to 4 (i.e., N=4) to generate sample vectors comprising 16 features each, so that each sample vector effectively represents measurements across 4 time epochs. By grouping samples across several time epochs, the synthesis of these event measurements can be used to build temporal models (reflective of the temporal behavior of the programs/processes being monitored to determine possible deviation from their normal behavior). It is to be noted that with the granularity at which the measurements are sampled, the execution of the ROP shellcode occurs within the span of just one sample.

Figure 5:
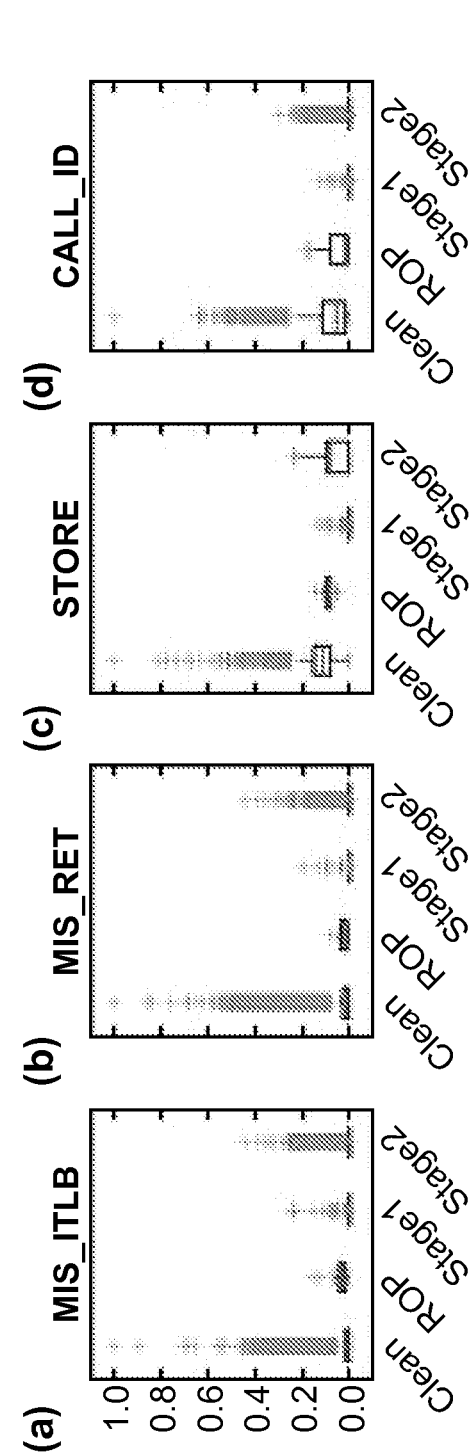
FIG. 5 includes "box-and-whisker" graphs for various event measurements taken during clean and infected execution of legitimate programs.

Experimentation and testing of the implementations described herein has shown that even for the subset of features that was selected because its features were determined to be capable to better distinguish clean hardware performance data from infected one, event anomalies are not trivially detectable. For example, FIG. 5 includes "box-and-whisker" 500*a-d* graphs, providing a visual gauge of the range and variance in micro-architectural measurements for various micro-architectural features, indicating the extent of how distinguishable measurements taken with the execution of different stages of malware code are from clean measurements from an exploit-free environment. The difficulty in seeing clear differences in the hardware performance of clean programs/processes from infected one stems from two key reasons: 1) most of the measurement distributions are positively skewed, with many values clustered near zero, and (2) deviations, if any, from the baseline event characteristics due to the exploit code are not easily discerned.

Thus, in some embodiments, hardware performance data may be processed using, for example, a rank-preserving power transform on the measurements to positively scale the values. For example, in the field of statistics, the power transform is a family of functions that is commonly applied to data to transform non-normally distributed data to one that has approximately normal distribution. Consequently, a power transform function applied to the obtained hardware performance data enables magnifying small deviations from the baseline characteristics of the running program/process caused through malware code execution. In some embodiments, for each event type, an appropriate power parameter $\lambda$ is determined or derived such that the normalized median of the performance counter values is roughly 0.5. The parameters $\lambda_i$ is determined and maintained for each event i in order to scale all its corresponding measurements. Each normalized and scaled event measurement for an event i, denoted as $normalized_i$, is transformed from the raw value, $raw_i$, as follows:

$$normalized_i = \left(\frac{raw_i - min_i}{max_i}\right)^{\lambda_i} \quad (1)$$

where the $min_i$ and $max_i$ are the minimum and maximum values for the event i.

Figure 6:
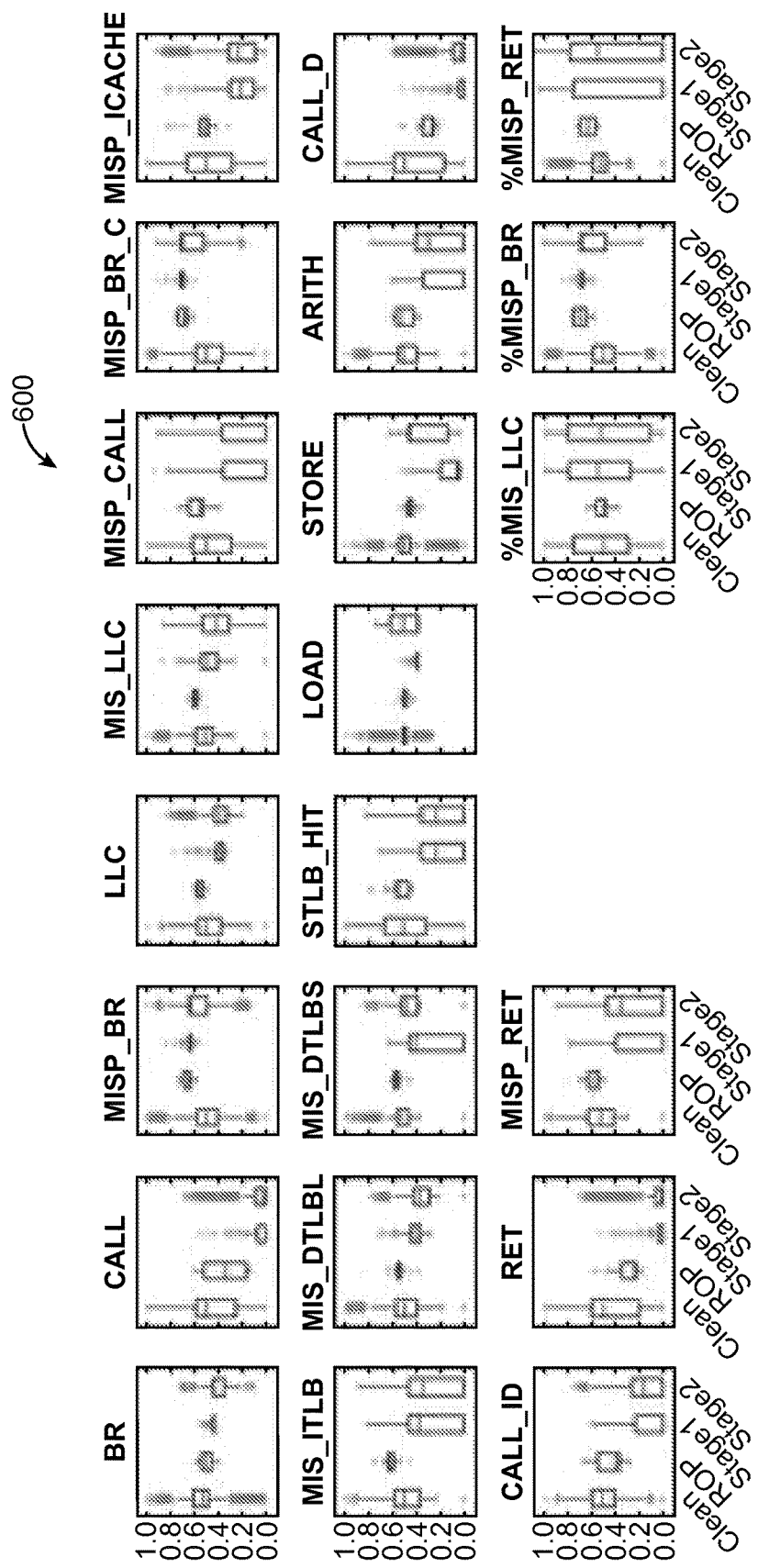
FIG. 6 includes "box-and-whisker" graphs for various event measurements to which transform functions were applied.

Using this power transform, the distributions of events may be plotted, resulting, for example, in the plots 600 illustrated in FIG. 6, in which deviations from baseline distributions for various events are more discernable than for the distributions obtained without using transform functions. Thus, the application of a transform function, such as a power transform function, on hardware performance data enables more clearly delineating deviations from baseline characteristics due to different stages of malware code execution for various event types. Some events (such as MISP_RET and STORE) show relatively larger deviations, especially for the Stage1 exploit shellcode. These events likely possess greater discriminative power in indicating the presence of malware code execution. There are also certain events that are visually correlated. For example, the RET and CALL exhibit similar distributions. Additionally, a strong correlation between certain derived/computed events (such as % MISP_BR) and their constituent events can be observed.

In some embodiments, the processing performed on the obtained sample data to enable magnification or amplification of observed deviation from normal behavior of legitimate programs or processes may be implemented as part of the sampling unit 212, as part of the database 214, or as part of the classifier 216 unit, or as a separate unit dedicated to performing the processing described herein.

In some embodiments, the sampling unit 212 may be realized, at least in part, on the hardware device being monitored. For example, the sampling unit 212 may be implemented as a hardware realization on a specialized hardware-based controller such as an FPGA, an ASIC, etc. In some embodiments, the sampling unit 212 may be realized, at least in part, as a software implementation executing on a machine that includes a processor-based device that is being monitored by the AV engine 210 to detect malicious processes that are executing on the machine and impacting normal performance of non-malicious processes. For example, one of a processor-device's multiple general-purpose cores may be allocated to execute a software realization of at least part of the AV engine. In some embodiments, the sampling unit may be realized as a software implementation configured to cause collection of hardware performance data from the processor(s) on which processes/programs monitored are executing.

As noted, the AV engine 210 depicted in FIG. 2 also includes the hardware performance database 214 that is configured to store the hardware performance data obtained from the hardware being monitored/observed, as well as pre-determined data sets (e.g., obtained from remote nodes, such as remote servers) that include data representative of normal behavior for various processes (e.g., non-malicious processes) that may execute on the hardware device being monitored (e.g., time-series traces for various hardware performance events). In some embodiments, the AV engine 210 may be periodically (at regular or irregular intervals) updated to include new or modified hardware performance data (e.g., hardware performance counter data) for processes that are be monitored.

In some embodiments, the database 214 may be realized, at least in part on the hardware device being monitored. In some embodiments, the hardware performance database 214 may be realized, at least in part, as a software implementation executing on a machine that includes the processor-based device being monitored by the AV engine 210 (e.g., allocating one of a processor-device's multiple general-purpose cores to execute a software realization of the database 214, or otherwise using the processor-device to run the database 214 of the AV implementation). In some embodiments, the database 214 may be implemented in hardware and/or software on a remote machine in communication with the hardware device being monitored.

With continued reference to FIG. 2, determination of whether a malicious process is impacting the performance of a victim (or potential victim) process is performed, in some embodiments, with the classifier 216 (also referred to as a machine-learning engine). The classifier 216 may also be configured, in some embodiments, to identify particular malicious processes.

In some implementations, a classifier, such as the classifier 216 of the AV engine 210, may be configured to iteratively analyze training input data and the input data's corresponding output (e.g., a determination that a malicious process is causing deviation from the normal behavior of a victim process, and/or identification of the malicious process), and derive functions or models that cause subsequent hardware performance data inputs, collected from the hardware device being monitored, to produce outputs consistent with the classifier's learned behavior. Such a classifier should be configured to identify malicious processes and/or determine deviations from the normal performance and behavior of legitimate (victim) processes.

Generally, machine learning classifiers are configured to examine data items and determine to which of N groups (classes) each data item belongs to. Classification procedures can produce a vector of probabilities, e.g., the likelihoods of the data item belonging to each class. In the anomaly-based process detection, two classes may be defined: normal behavior and abnormal behavior (potentially resulting from exploitation caused by malware). As a result, the output from classifiers may include probabilities representing the likelihood of a data item being impacted (e.g., exploited) by a malicious process.

In situations where a particular classifier is not adapted to process/classify time-series data (like the time-series hardware performance data collected by the AV engine 210) this difficulty is overcome by arranging input data (e.g., corresponding to hardware performance events occurring at a particular location of the hardware, such as at a particular counter) that occurred at different time instances into a single vector of features that is presented as input to the classifier. As noted, under this approach, time-based data may be consolidated (e.g., by the sampling unit 212 or the database 214) into a vector of data, where each vector point corresponds to a hardware performance data sample for a certain counter or location that occurred at a different time instance. Additionally and/or alternatively, another approach for processing time-dependent data (hardware performance data) using classifiers that are generally not configured to handle sequences of time-dependent data is to separately process with such a classifier data points taken for a particular process at different time instances, and aggregate the classifier's results in order to classify the entire process. In some embodiments, different aggregation operations may be applied to a classifier's results, and the aggregation operation that is determined (e.g., through testing and experimentation) to yield the best classification results may be used to perform future aggregation operations. For example, one aggregation operation that may be used is a simple average operation. Another aggregation operation that may be used is a weighted average operation in which, for example, data points which are equally probable to belong to each of the various available classes are given zero weight, whereas data points with high probabilities are given relatively large weights.

The types of classifiers that may be used to process/analyze the collected hardware performance data points corresponding to the executing processes belong to two main classifier categories: linear classifiers, and non-linear classifiers. Linear classification procedures are configured to attempt to separate n-dimensional data points by a hyperplane—points on one side of the plane are points of class X and points on the other side are of class Y. Non-linear classifiers generally do not rely on this type of linear separation. Thus, any operation to derive a classification may be applied.

In some embodiments, one or more classification procedures may be applied directly to current hardware performance data collected by the sampling unit (or the one or more classification procedures may be applied to data resulting from some post-sampling operation, such as a transform function, applied to the current hardware performance data). The classifier(s) determines from the current hardware performance data, presented as input to the classifier(s), whether that input data potentially corresponds to infected hardware performance data that deviates from the normal (clean) hardware performance data.

More particularly, the use of hardware performance counter (HPC) measurements (or other hardware performance measurements) for anomaly-based detection of malware exploits requires a classification model to describe the baseline characteristics (e.g., baseline data for various events, such as the events listed in the table 400 of FIG. 4, determined to be effective in enabling discriminating clean performance data from infected performance data) for each program/process that is to be protected. Such program characteristics are relatively rich in information and, therefore, given the large number of programs/processes available, manually building the models is difficult. Instead, unsupervised machine learning techniques may be used to dynamically learn possible hidden structures in the data. Such hidden structures (also referred to as models) can be used to detect deviations during exploitation. The one-class approach is generally very useful because the classifier can be trained solely with measurements taken from a clean environment. This removes the need to gather measurements affected by exploited code, which is hard to implement and gather in practice. In some embodiments, characteristics can be modeled with the one-class Support Vector Machine (oc-SVM) classifier that uses the non-linear Radial Basis Function (RBF) kernel. In some embodiments, other types of classifiers may be used, including:

K-Nearest Neighbors (KNN)—A KNN classifier is trained by inserting the training data points along with their labels into a spatial data structure, like a k-dimensional tree (referred to as a "k-d-tree") used for organizing points/data in a k-dimensional space. In order to classify a data point, that point's k nearest neighbors (in Euclidean space) are found using the spatial data structure. The probability that the data point is of a particular class is determined by how many of the data point's neighbors are of that class and how far they are from each other.

Decision Tree—Another way to classify data points it to use a non-spatial tree called a decision tree. This tree is built by recursively splitting training data into groups on a particular dimension. The dimension and split points are chosen to minimize the entropy with each group. These decisions can also integrate some randomness, decreasing the quality of the tree but helping to prevent overtraining. After some minimum entropy is met, or a maximum depth hit, a branch terminates, storing in it the mix of labels in its group. To classify a new data point, the decision tree traverses the tree to find the new point's group (leaf node), and returns the stored mix.

Random Forest—One way to increase the accuracy of a classifier is to use a lot of different classifiers and combine the results. In a random forest, multiple decision trees are built using some randomness. When classifying a new data point, the results of all trees in the forest are weighted equally to produce a result.

Artificial Neural Network (ANN)—A neural network machine attempts to model biological brains by including neurons which are connected to each other with various weights. The weight values between connections can be varied, thus enabling the neural network to adapt (or learn) in response to training data it receives. In feed-forward neural nets, input values are supplied at one edge and propagate through a cycle-less network to the output nodes. In some embodiments, one input neuron for each dimension, and two output nodes (e.g., one indicating the probability that a malware is running, one indicating the probability that no malware is running) are defined.

Tensor Density—this classifier discretizes the input space into different buckets. Each bucket contains the mix of classes in the training data set. A data point is classified by finding its bin and returning the stored mix. Generally, a tensor density classifier uses O(1) lookup time, and is thus considered to be time-efficient.

In some embodiments, the classifiers may be implemented using regression techniques to derive best-fit curves, a classification procedure based on hidden Markov model, and/or other types of machine learning techniques. In embodiments in which a hidden Markov model-based classifier is used, patterns in the data (e.g., hardware performance data) being processed may be identified using self-similarity analysis, and the transitions in patterns may be used to build the hidden Markov model with which data is classified. In some embodiments, linear classification techniques like kernel methods which are capable of accurately classifying data but with reduced computational requirements may also be used.

In some embodiments, classification procedures may be applied to scores/metrics/measures that are computed from the obtained current hardware performance data (or from data resulting from some post-sampling processing, such as the transform function processing described herein) corresponding to the victim process(es) being monitored, and the pre-recorded hardware performance data representative of the normal behavior of the victim process(es). Such computed scores may be representative of a difference between current behavior of the victim process and the normal behavior of the victim process.

As noted, an AV engine, such as the AV engine 210 of FIG. 2, may be realized entirely in hardware (e.g., implemented as a module on the hardware device that is to be monitored), entirely in software (e.g., as a software application executing on a computing system that includes the hardware to be monitored), or as a hardware-software combination implementation in which one component (e.g., the sampling unit 212 of FIG. 2) is implemented in hardware, while the database and classifier units 214 and 216 are implemented, for example, via software (which may be executing on a local or remote machine, or executing on the hardware device being monitored. If implemented at least partly by software, the software component(s) may be configured to communicate with the hardware component (e.g., using interfacing procedures) to receive data (e.g., hardware performance data obtained by the sampling unit) and/or to transmit data or control signals to the hardware-based component.

Figure 7:
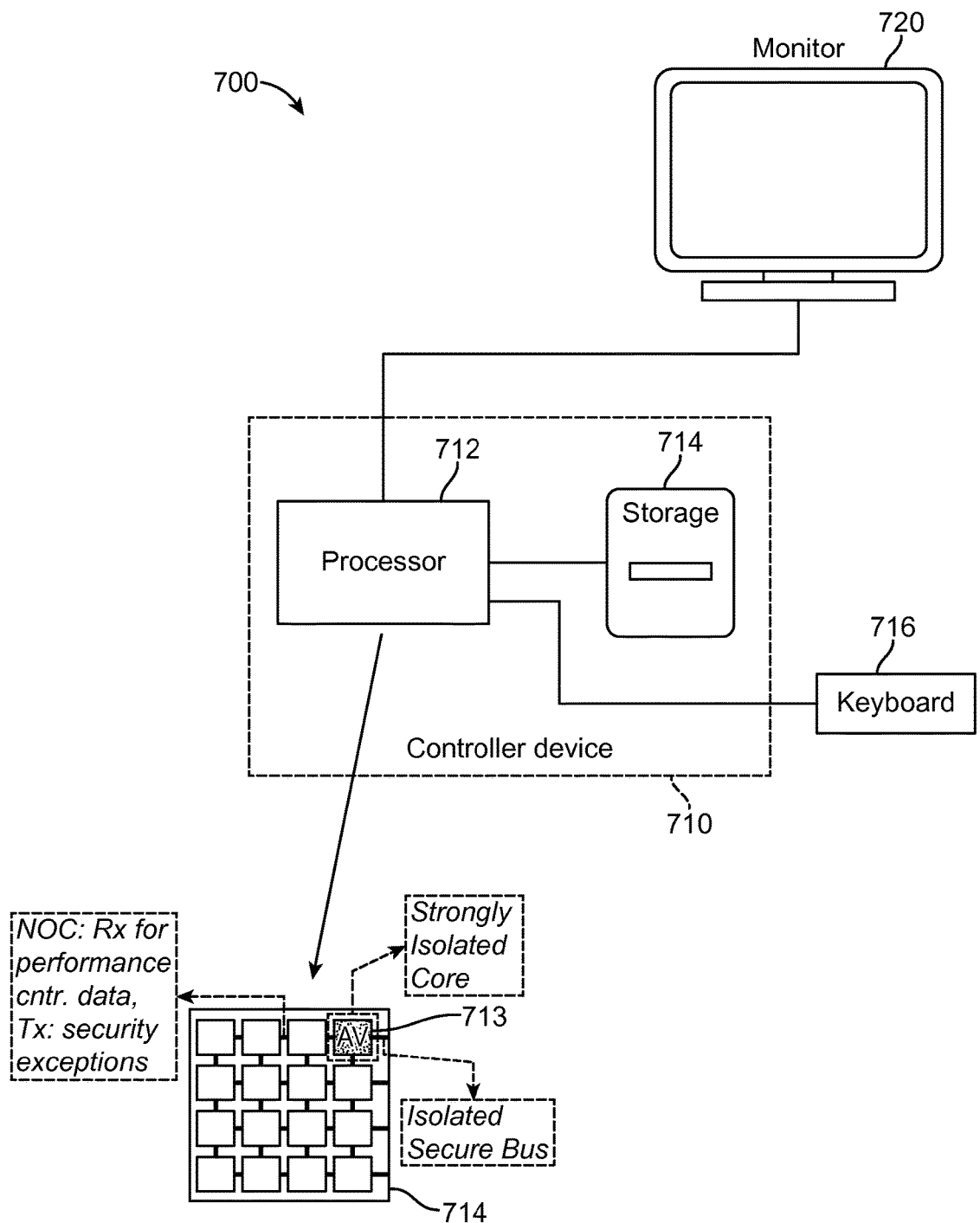
FIG. 7 is a schematic diagram of an example system in which an AV engine is implemented.

With reference to FIG. 7, an example system 700, in which an AV engine (such as the AV engine 210 of FIG. 2)

is implemented, is shown. The system 700 includes a controller device 710, which may be a personal computer, a specialized computing device (programmable device or otherwise), and so forth, and which includes, in some implementations, a processor-based device or unit such as central processor unit (CPU) 712. In some embodiments, the controller device 710 may be realized, at least in part, using modules such as an FPGA (field programmable gate array), an ASIC (application-specific integrated circuit), a DSP processor, etc.

As noted, in some embodiments, at least part of the AV engine may be implemented in hardware directly on the hardware device that is to be monitored, and/or may be implemented in software executing on a dedicated (and/or secure) controller device. For example, as depicted in FIG. 7, the CPU 712 may be a multi-core processor, and the hardware portion of the AV engine may be realized on one or more of the cores 713 of the CPU 712, and be configured (e.g., through pre- or post-manufacturing programming) to perform one or more of the functions of the AV engine (e.g., collect hardware performance data). If the hardware device to be monitored is an application-specific controller device (e.g., implemented as an application-specific integrated circuit), the hardware-portion of the AV may be realized at the time of manufacturing of the controller, e.g., as a special-purpose malware detection units that sit on a network-on-chip, on-chip/off-chip FPGA, or off-chip ASIC co-processor. These choices represent different trade-offs in terms of flexibility and area- and energy-efficiency. Moving security protection to the hardware level solves several problems and provides some interesting opportunities. For example, it ensures that the security system cannot be disabled by software, even if the kernel is compromised. Second, because the security system runs beneath the operating system, the security system might be able to protect against kernel exploits and other attacks against the kernel. Third, because the hardware itself is being modified (to accommodate at least some portions of the AV engine), arbitrary static and dynamic monitoring capabilities can be added. This gives the security system extensive viewing capabilities into software behavior.

As further shown in FIG. 7, in addition to the CPU 712 and/or other application-specific hardware to implement controller functionality, the system 700 includes main memory, cache memory and bus interface circuits (not shown in FIG. 7). For example, the controller device 710 may include a mass storage element 714, such as a hard drive or flash drive associated with the system. The computing system 700 may further include a keyboard, or keypad, or some other user input interface 716, and a monitor 720, e.g., a CRT (cathode ray tube), LCD (liquid crystal display) monitor, etc., that may be placed where a user can access them.

The controller device 710 is configured to facilitate, for example, the implementation of operations to obtain current hardware performance data resulting from execution of one or more processes or programs (e.g., legitimate processes which may have been compromised by execution of malware) on the CPU 712 and/or on some other application-specific device on which processes are executing (or can be executed) and determine, based on the hardware performance data obtained, whether the current hardware performance data deviates from the normal hardware performance behavior (represented by previously obtained baseline hardware performance data) of one or more of the executing processes. In some embodiments, identities of the one or more malwares causing deviation from the normal behavior of the one or more processes executing may be determined based on the current hardware performance data collected or obtained. The storage device 714 may thus include in some embodiments (e.g., embodiments in which the AV is implemented, at least partially, in software) a computer program product that when executed on, for example, a processor-based implementation of the controller device 710 causes the device to perform operations to facilitate the implementation of procedures described, including the procedures to obtain hardware performance data and determine deviation from the normal hardware performance behavior of legitimate processes running on the controller device 710.

The controller device 710 may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. As noted, alternatively and/or additionally, in some embodiments, special purpose logic circuitry, e.g., an FPGA (field programmable gate array), an ASIC (application-specific integrated circuit), a DSP processor, etc., may be used in the implementation of the system 700. Other modules that may be included with the controller device 710 are speakers, a sound card, a pointing device, e.g., a mouse or a trackball, by which the user can provide input to the system 700. The controller device 710 may include an operating system, e.g., Windows XP® Microsoft Corporation operating system, Unix, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. Non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. In some embodiments, transitory media may be used to provide computer instructions, and may include, for example, signals on networks, in wires, conductors, optical fibers, circuits, any suitable media that is fleeting and devoid of any semblance of permanence during transmission, and/or any suitable intangible media.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication, e.g., a communication network. Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

Figure 8:
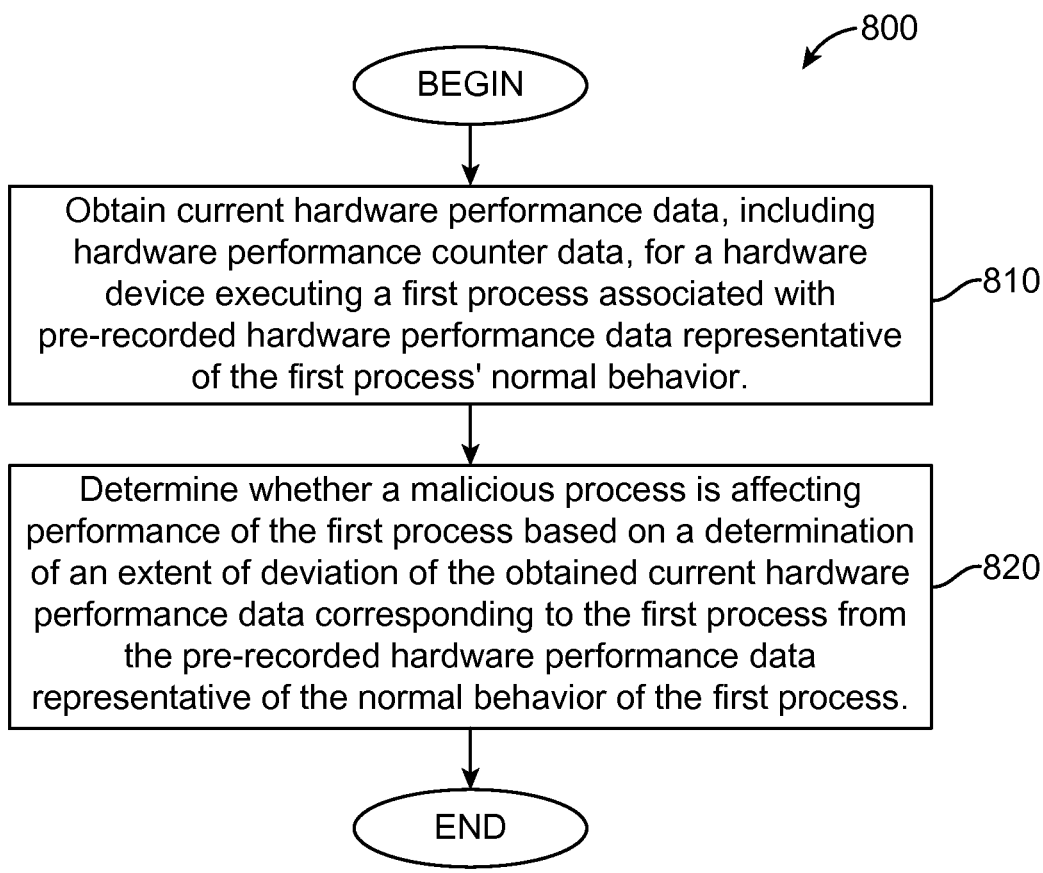
FIG. 8 is a flowchart of an example procedure to detect malicious processes.

With reference now to FIG. 8, a flowchart of an example procedure 800 to determine if a malicious process is affecting a victim process is shown. The procedure 800 includes obtaining 810 current hardware performance data, including hardware performance counter data, for a hardware device executing a first process associated with pre-recorded hardware performance data representative of the first process' normal behavior. As noted, in some embodiments, obtaining the hardware performance data may be performed by a sampling unit, which may be implemented, at least partly, in hardware as part of the hardware-device running legitimate processes (e.g., Internet Explored, Adobe PDF Reader, etc.) whose behavior, as represented by hardware performance data (e.g., measured by hardware performance counters), is to be monitored. In some embodiments, the hardware performance data may be obtained periodically at regular or irregular intervals (e.g., at intervals of length determined by a pseudo random process), and may be obtained through a data-pull process (e.g., by the sampling unit initiating the collection of the hardware performance data, with or without interruption of the hardware device running the processes) or through a data push process (e.g., the hardware device initiating periodic communication of hardware performance data to an AV engine). In some embodiments, only a subset of hardware performance data may be collected, e.g., for events/features whose corresponding hardware performance measurements generally can show a distinction between performance data collected for clean processes/programs and infected processes/programs. The selection of such a subset may be based on computed metrics (e.g., F-scores) for the various features or events.

Using the obtained current hardware performance data, a determination is made 820 whether a malicious process (e.g., malware) is affecting performance of the first process (e.g., a victim process) based on a determination of an extent of deviation of the obtained current hardware performance data corresponding to the first process from the pre-recorded hardware performance data representative of the normal behavior of the first process. In some embodiments, a more specific determination may be made of a type or identity of the malicious process(es) causing the deviation from the victim process' normal behavior. As noted, determination of whether a hardware performance data resulting from execution of a process is such that it deviates from the process' normal hardware performance data may be performed using a machine learning system that may include one or more classifiers (such as the one or more classifiers 216*a-n* illustrated in FIG. 2) that were trained using, for example, clean (non-infected) hardware performance data obtained for the various legitimate processes or programs that are to be monitored. In some embodiments, such one or more classifiers may include one or more of, for example, a support vector machine implementing a non-linear radial basis function (RBF) kernel, a k-nearest neighbor procedure, a decision tree procedure, a random forest procedure, an artificial neural network procedure, a tensor density procedure, and/or a hidden Markov model procedure.

To determine the efficacy of the systems, procedures, and other implementations described herein to determine whether a malicious process has affected the normal behavior of a legitimate program/process being monitored, and/or to identify that malicious process, the systems, procedures and other implementations describe herein were tested using the following experimental setup.

The exploits that were used to determine the efficacy of the systems, procedures, and other implementations described herein, included the exploits CVE-2012-4792, CVE-2012-1535, and CVE-2010-2883, which target the security vulnerabilities on Internet Explorer (IE) 8 and two of its web plug-ins, namely, Adobe Flash 11.3.300.257 and Adobe Reader 9.3.4. The exploits were generated using a widely-used penetration testing tool Metasploit. Metasploit was used because the exploitation techniques it employs are representative of multi-stage nature of real-world exploits. Different vulnerabilities were targeted using different ROP shellcode, and the Stage1 shellcode and the Stage2 final payload used in the exploits were varied. The variability in the generated exploits is summarized in Table 1 below.

TABLE 1

| Stage | Variation |
| --- | --- |
| ROP | msvcrt.dll, icucnv36.dll, flash32.ocx |
| Stage1 | reverse_tcp, reverse_http, bind_tcp |
| Stage2 | meterpreter, vncinject, command_shell |

A Windows driver was developed to configure the performance monitoring unit on Intel i7 2.7 GHz IvyBridge Processor to interrupt once every N instructions and collect the event counts from the HPCs. The Process IDs (PIDs) of currently executing programs/processes were also collected so that the measurements could be filtered/tracked based on processes. Measurements were collected from a VMware Virtual Machine (VM) environment, installed with Windows XP SP3 and running a single-core with 512 MB of memory. With the virtualized HPCs in the VM, this processor enables the counting of two fixed events (clock cycles, instruction retired) and up to a limit of four events simultaneously. The HPCs were configured to update the event counts only in the user mode.

To ensure experiment fidelity for the initial study, the measurements from the memory buffer were read and transferred via TCP network sockets to a recorder that was deployed in another VM. This recorder was configured to save the stream of measurements in a local file that was used for the analysis.

During the testing and experimentation for the systems, processes, and implementation described herein, various sampling interval (of N instructions) were used. Initially, a sampling rate of once every 512,000 instructions was used because it provides a reasonable amount of measurements without incurring too much overhead. Each sample includes the event counts from one sampling time epoch, along with the identifying PID and exploit stage label.

In order to obtain clean exploit-free measurements for Internet Explorer 8, websites that use different popular web plugins for Internet Explorer (IE), e.g., Flash, Java, PDF, Silverlight, Windows Media Player extensions, etc., were accessed using an IE 8 browser running on a local machine. Particularly, fifteen (15) different sites were accessed, and plugin download and installation functions were simulated.

In order to obtain clean, exploit-free, measurements for Adobe PDF, 400 random PDFs were downloaded from the web.

In order to collect infected measurements, the same browser that was used to collect clean data was used to access (i.e., browse) various web pages while IE-specific exploits were activated. For PDF exploit measurement, a different set of 400 random documents was generated, and Metasploit was used to insert exploits into those documents. Both the clean and unclean PDFs had the same distribution of file types (e.g., same amount of Javascript). Generally, the same input sets were used for different measurements, with the VM environment restored between each run of the exploit to its pre-run state to ensure the samples collected from a subsequent run was not contaminated from a previous run. To reduce measurement bias resulting from the exploits being loaded in only one way, during the testing and experimentation into victim programs three different loading mechanism were alternately used, namely, a) launching the program and loading the URL link of the generated exploit page, b) loading the exploit page into an already running program instance, and c) saving the exploit URL in a shortcut file and launching the link shortcut with the program. To ensure that different network latencies (of networks interacting with the VM) do not confound the measurements, the VM environment was configured to connect to an internally-configured Squid 4 proxy and vary the bandwidth limits for the network connectivity. The bandwidth limits were varied while collecting measurements for both the exploit code execution and clean runs.

To visualize the classification performance of the models, Receiver Operating Characteristic (ROC) curves, which plot the percentage of truly identified malicious samples (i.e., true positive rate) against the percentage of clean samples falsely classified as malicious (false positive rate) were constructed. Furthermore, to contrast the relative performance between the models in the detection of malicious samples, the area under the ROC curve for each model can be computed and compared. This area, commonly termed as the Area Under Curve (AUC) score, provides a quantitative measure of how well a model can distinguish between the clean and malicious samples for varying thresholds. The higher the AUC score, the better the detection performance of the model.

Figures 9A, 9B:
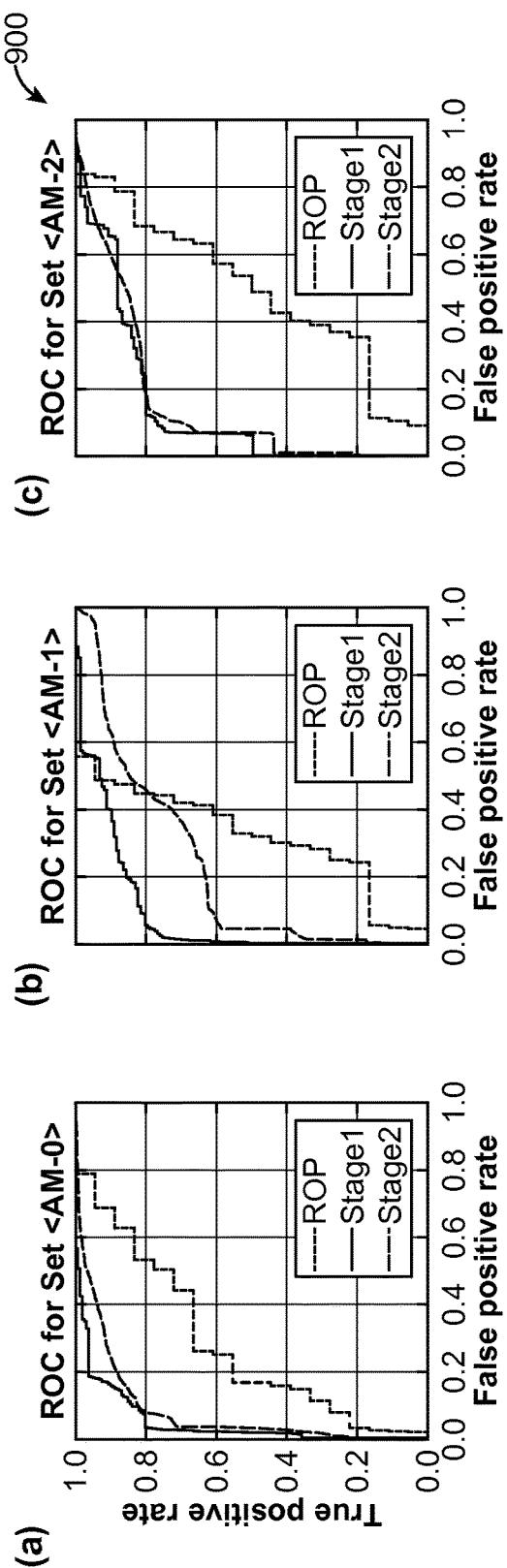
FIGS. 9A-B include ROC curves for non-temporal and temporal feature sets.
Figure 10:
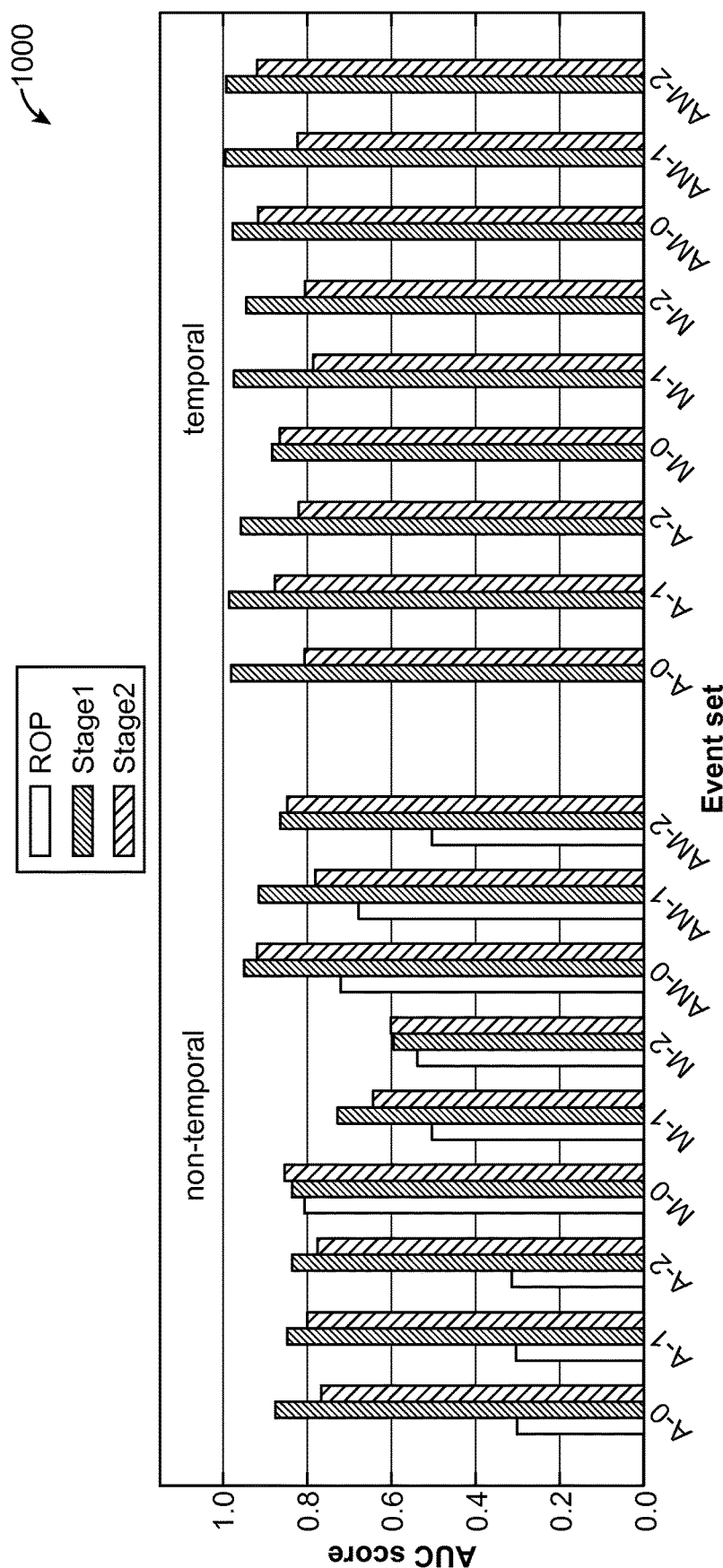
FIG. 10 is a graph illustrating detection results in terms of Area-Under-the-Curve (AUC) scores for different event sets using non-temporal and temporal models for Internet Explorer.

Thus, the oc-SVM models were first built with training data, and then evaluated with the testing data using non-temporal and temporal model approaches for the nine event sets. FIG. 9A includes graphs 900a-c illustrating ROC curves for non-temporal 4-feature models for Internet Explorer (the feature set indicated for each graph corresponds to the feature set provided in the table 400 of FIG. 4), while FIG. 9B includes graphs 910a-c of ROC curves for temporal 16-feature models for Internet Explorer. FIG. 10 includes a graph 1000 presenting the overall detection results in terms of AUC scores for different event sets using non-temporal and temporal models for Internet Explorer.

The evaluation and testing results indicate that the models, in general, perform best in the detection of the Stage1 shellcode. These results suggest the Stage1 shellcode exhibits the largest deviations from the baseline architectural and micro-architectural characteristics of benign (i.e., non-infected) code. A best-case detection accuracy of 99.5% for Stage1 shellcode can be achieved with the AM-1 model. On the other hand, the models show lesser detection capabilities for the ROP shellcode. The models do not perform well in the detection of the ROP shellcode possibly because the sampling granularity at 512 k instructions may be too large to capture the deviations in the baseline models. While the Stage1 and Stage2 shellcode executes within several time epochs, the ROP shellcode was measured to take 2182 instructions on average to complete execution. It ranges from as few as 134 instructions (e.g., for a Flash ROP exploit) to 6016 instructions (e.g., for a PDF ROP exploit). Because of the sampling granularity constant, a sample that contains measurements during the ROP shellcode execution generally also includes samples from the normal code execution.

The testing and evaluation results (as also reflected in the graphs of FIGS. 9A, 9B, and 10) further show that the detection accuracy of the models for all event sets improves with the use of temporal information. By including more temporal information in each sample vector, deviations (which may already be observable in the non-temporal approach) are magnified. For one event set M-2, the temporal approach of building the models improves the AUC score from the non-temporal one by up to 59%.

As further shown by the testing and evaluation results performed for the implementations described herein, models built using only architectural events generally performed better than those built solely with micro-architectural events. By selecting and modeling both the most discriminative architectural and micro-architectural events together, higher detection rates can be achieved, e.g., up to an AUC score of 99.5% for event set AM-1.

In additional testing performed for the implementations described herein, measurements were collected from one virtual machine (VM) and transferred to the recorder in another VM to be saved and processed. This cross-remote-VM scenario, where the sampling and the online classification are performed on different VMs, is referred to as R-1core. To assess the effect on detection accuracy in the scenario where both the online classification and the measurement gathering were deployed in the same VM, the experiment was run for the model set AM-1 using two additional local-VM scenarios using 1 and 2 cores. These two scenarios are referred to as L-1core and L-2core, respectively. The detection AUC scores for the three different scenarios are provided in table 1100 of FIG. 11A. It can be observed that the detection performance suffers when the online classification detector is deployed locally together with the sampling driver. This can be attributed to the possible noise that is introduced to the event counts while the online detector is continuously running and taking in the stream of samples.

While the above-described experiment results were obtained using a sampling rate of 512 k instructions, the effect on detection efficacy was also investigated for a range of sampling granularities. Furthermore, while the hardware-based HPCs incur a near zero overhead in the monitoring of the event counts, a software-only implementation of the detector still requires running programs to be interrupted periodically to sample the event counts. This inadvertently leads to a slowdown of the overall running time of programs due to this sampling overhead. Thus, to investigate the deployment of a software-only implementation of such a detection paradigm, the sampling performance overhead was evaluated for different sampling rates.

Figure 12:
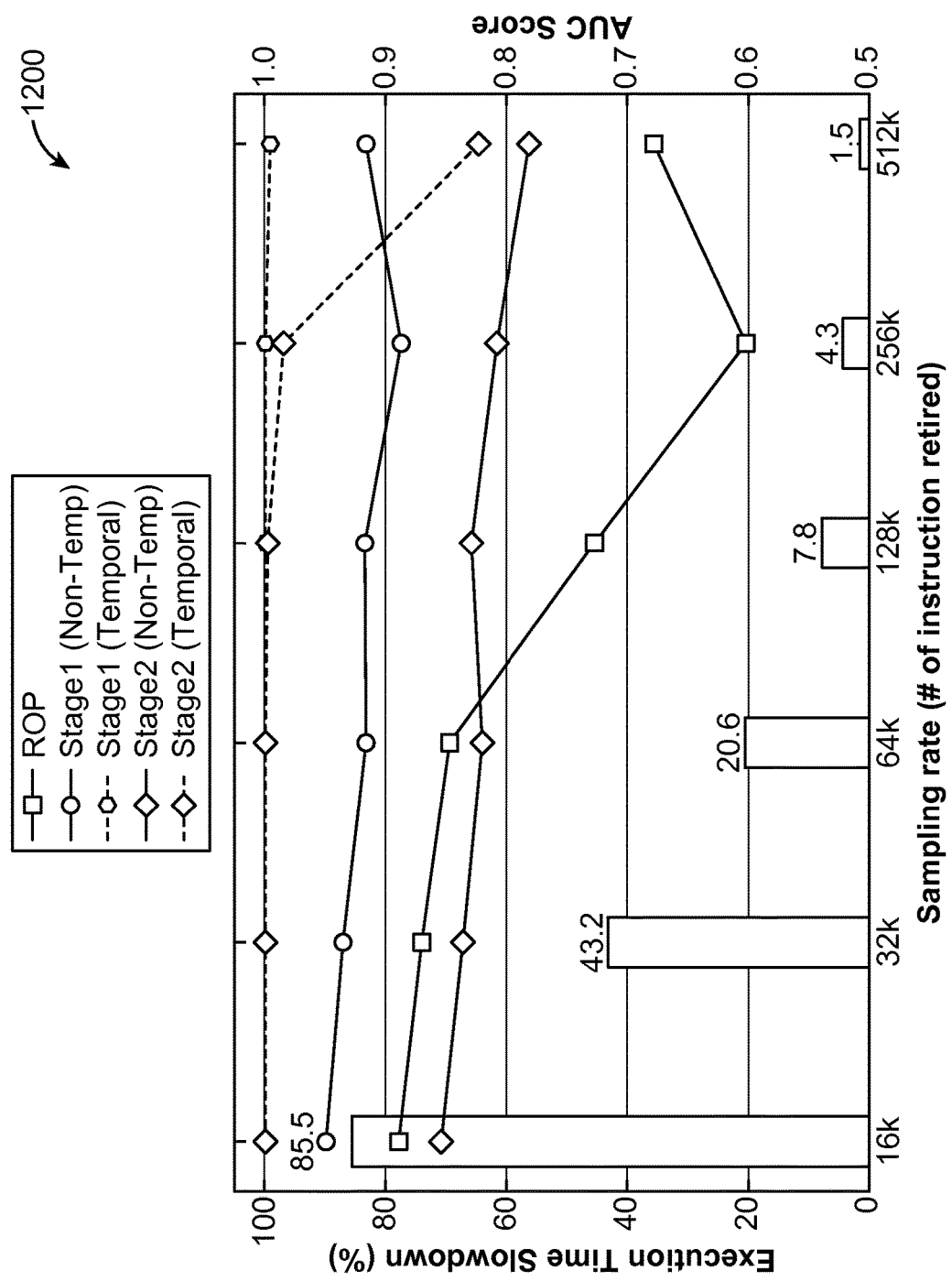
FIG. 12 is a graph providing execution time slowdown over different sampling rates with corresponding detection AUC scores for various malware exploit stages.

To measure the sampling performance overhead, the sampling granularity was varied and the resulting slowdown in the programs from the SPEC 2006 benchmark suite was measured. The experiments using the event set AM-1 were also repeated in order to study the effect sampling granularity has on the detection accuracy of the model. The execution time slowdown over different sampling rates with the corresponding detection AUC scores for various malware exploit stages are presented in graph 1200 of FIG. 12. It can be seen from FIG. 12 that the detection performance generally deteriorates with coarser-grained sampling. This is a result of the imprecise sampling technique used. For example, although measurements obtained during the span of instructions may be labelled as belonging to a specific process PID, the measurements in this sample may also contain measurements belonging to other processes context-switched in and out during the span of this sample. This "noise" effect becomes more pronounced with a coarser-grained sampling rate and causes deterioration of the detection performance. Nonetheless, it is to be noted that the reduction in sampling overhead at coarser-grained rates outstrips the decrease in detection performance.

Table 1110 in FIG. 11B provides the AUC detection performance results obtained for the Adobe PDF program using models built with the event sets AM-0, 1, 2. Compared to the models for Internet Explorer, the detection of ROP and Stage1 shellcode generally improves for the Adobe PDF Reader, with an AUC score of 0.999 achieved for the temporal modeling of the AM-1 event set. The improved performance of this detection technique for the PDF Reader suggests that its baseline characteristics are more stable given the less varied range of inputs it handles compared to IE.

Thus, the systems, processes, and implementations described herein can effectively detect anomalous execution of malware through monitoring of architectural and micro-architectural behavior of victim processes that is manifested through the code execution of malware shellcode. This is, in part, based on the fact that while an adversary (attacker) has complete freedom in crafting the attack instruction sequences to evade the target systems, the adversary cannot directly modify the events exhibited by the attack code to evade the detection approach described herein. An adversary could try to conduct a mimicry attack so as to carefully "massage" the attack code to manifest a combination of event behaviors that would be accepted as benign/normal. This second-order degree of control over the event characteristics of the shellcode adds difficulty to the adversary's evasion efforts.

Nevertheless, to thwart such attack evasion efforts by the attacker/adversary, several additional defensive strategies and approaches may be taken to make the systems, procedures, and other implementations described herein more robust. One such additional strategy is to introduce randomizations into the models by training multiple models using different subsets of the shortlisted events. The choice of the models to utilize over time may also be randomized. Another randomization element that may be used is to change the number of consecutive samples to use for each sample for the temporal models. In this manner, an attacker would not know which model is used during the execution of the attacker's attack shellcode. For the attacker's exploit to be portable and functional over a wide range of targets, the attacker would have to modify her shellcode using, for example, no-op padding and instruction substitution mimicry attacks for a wider range of events. To get a sense of the diversity introduced with this approach, assume that there are ten (10) different events in the pool of events that could be selected for the models, and that the number of consecutive samples could be varied from a range of 3 to 6. With these two degrees of freedom, the number of possible different models that can be constructed is $$\binom{10}{4} \cdot 4 = 840.$$

The number of possibilities increases substantially if there are more events in the pool. Increasing the pool of events from 10 to 20 will then result in $$\binom{20}{4} \cdot 4 = 19380,$$

a 23-fold increase.

Another strategy that can be used to further thwart attempts by an attacker to evade detection of the attacker's malware by the systems, procedures, and other implementations described herein is the multiplexing strategy. Particularly, at the cost of higher sampling overhead, sampling may be performed at a finer sampling granularity and more events (instead of the current four) may be measured by multiplexing the monitoring as follows. For example, the simultaneous monitoring of 8 events across two time epochs may be approximated by monitoring 4 events in one epoch and another 4 events in the other epoch. This affords more dimensionality to the input vectors used in the models, thus increasing the efforts needed by an adversary to make all the increased number of monitored event measurements look non-anomalous.

Yet a further strategy to counter malware evasion attempts is the "Defense-in-Depth" approach. In such an approach, a malware anomaly detector, based on HPC manifestations, is deployed along with other anomaly-based detectors monitoring for other features of the malware (e.g., syntactic and semantic structures, execution behavior at system-call level, execution behavior at the function level, etc.) In such a setting, for an attack to be successful, an adversary is forced to shape the attack code to conform to normalcy for each anomaly detection model.

Furthermore, there are additional architectural enhancements that may be used to further improve the performance of the systems, procedures, and other implementations described herein. One architectural improvement that may be introduced is to use more performance counters. The testing and experimentation conducted in relation to the systems, procedures, and other implementations described herein indicated that adding events can help better distinguish between benign and malicious code execution. Thus, expanding the set of performance counters that can be monitored concurrently can potentially increase detection fidelity. Inexpensive hardware mechanisms to observe instruction and data working set changes, and basic block level execution frequencies can improve malware detection accuracies further. Another architectural enhancement that can be introduced is to rely more heavily on interrupt-less periodic access. In some embodiments, reading performance counters requires the host process to be interrupted. This leads to expensive interrupt-handling costs and undue sampling overhead to the programs. If the performance monitoring units are implemented with the capability to store performance counter measurements periodically to a designated memory region without generating interrupts, accessing the samples from this region directly may eliminate the sampling overhead. Importantly, this allows for monitoring at finer granularities to reduce the "noise" effect, and leaves greater scope for better detection. Yet another architectural enhancement that may be introduced is to examine behavior of the processes/programs monitored using non-public events, e.g., collect data micro-architectural data from performance counters that the attacker may not be aware of, and thus cannot design the attack to try and evade such performance counters. Keeping the events secret increases the difficulty of the attacker to conduct evasion attacks.

In addition to being configured to collect (and/or store) hardware performance data and analyze the collected hardware performance data to determine whether there was a deviation from the normal behavior of legitimate processes due to possible execution of malware (and possibly more particularly identify the malware execution) an AV engine, such as the AV engine 210 of FIG. 2, may also be configured, in some embodiments, to take certain actions if a threat is detected (e.g., shut down the hardware or report the malicious behavior). More particularly, there are a wide variety of security policies that can be implemented by an AV engine such as the AV engine 210. Some viable security policies include:

- Using the AV engine as a first-stage malware predictor—When the AV engine suspects a program to be malicious it can run more sophisticated behavioral analysis on the program. Hardware analysis happens 'at speed' and is significantly faster than behavioral analysis used by malicious process analysts to create signatures. Such pre-filtering can avoid costly behavioral processing for 'goodware.'
- Migrating sensitive computation—In multi-tenant settings such as public clouds, when the AV engine suspects that an active thread on the system is being attacked the AV engine can move the sensitive computation. In some scenarios it may be acceptable for the AV system to simply kill a suspected attacked process.
- Using the AV engine for forensics—Logging data for forensics is expensive as it often involves logging all interactions between the suspect process and the environment. To mitigate these overheads, the information necessary for forensics can be logged only when the AV engine makes a determination of the possible execution of a malicious process.

Thus, there is a broad spectrum of actions that can be taken based on the AV engine's output. The systems, procedures, and other implementations described herein to implement an AV engine should be flexible enough to implement the above-described security policies. Conceptually, this means that, in some embodiments, the AV engine should be able to interrupt computation on any given core and run the policy payload on that machine. This requires the AV engine to be able to issue a non-maskable inter-processor interrupt. Optionally, in some embodiments, the AV engine can communicate to the OS or supervisory software that it has detected a suspect process so that the system can start migrating other co-resident sensitive computation. In some embodiments, the AV engine may also be configured to run in the highest privilege mode.

As noted, in some embodiments, an AV engine, such as the AV engine 210 of FIG. 2, may be configured to be updated with new clean baseline hardware performance data (for current or new processes that may be running on the local computing device(s)) as they become available, or when new classification techniques are implemented. The AV update should be implemented in a way to prevent attackers from compromising the AV.

Figure 13A:
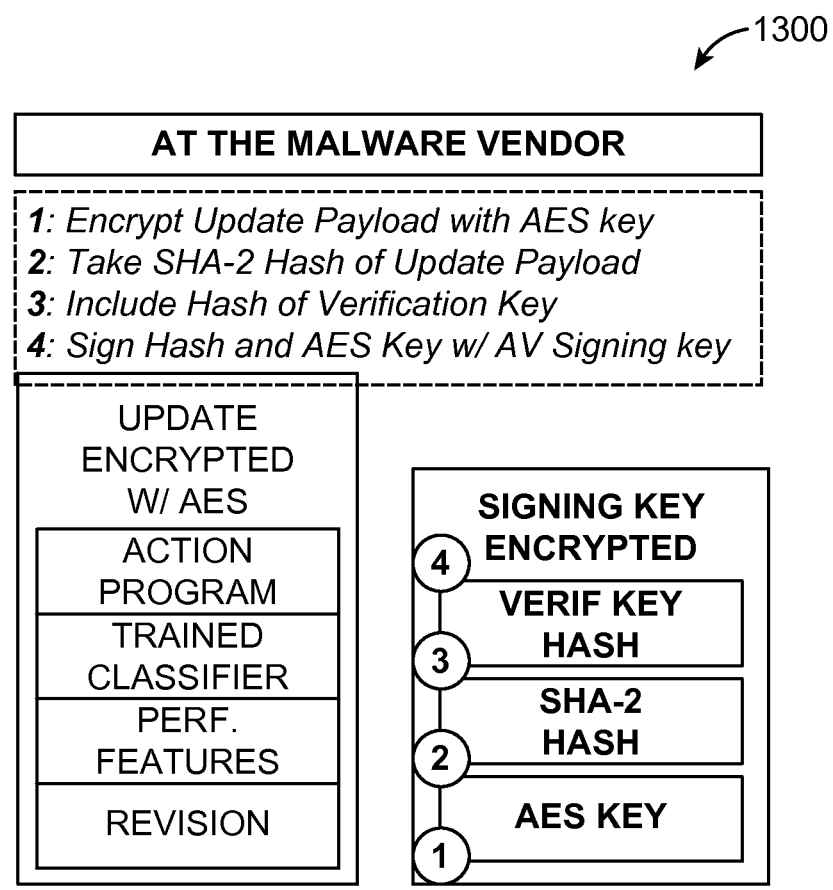
FIG. 13A is a schematic diagram of an example security update payload.
Figure 13B:
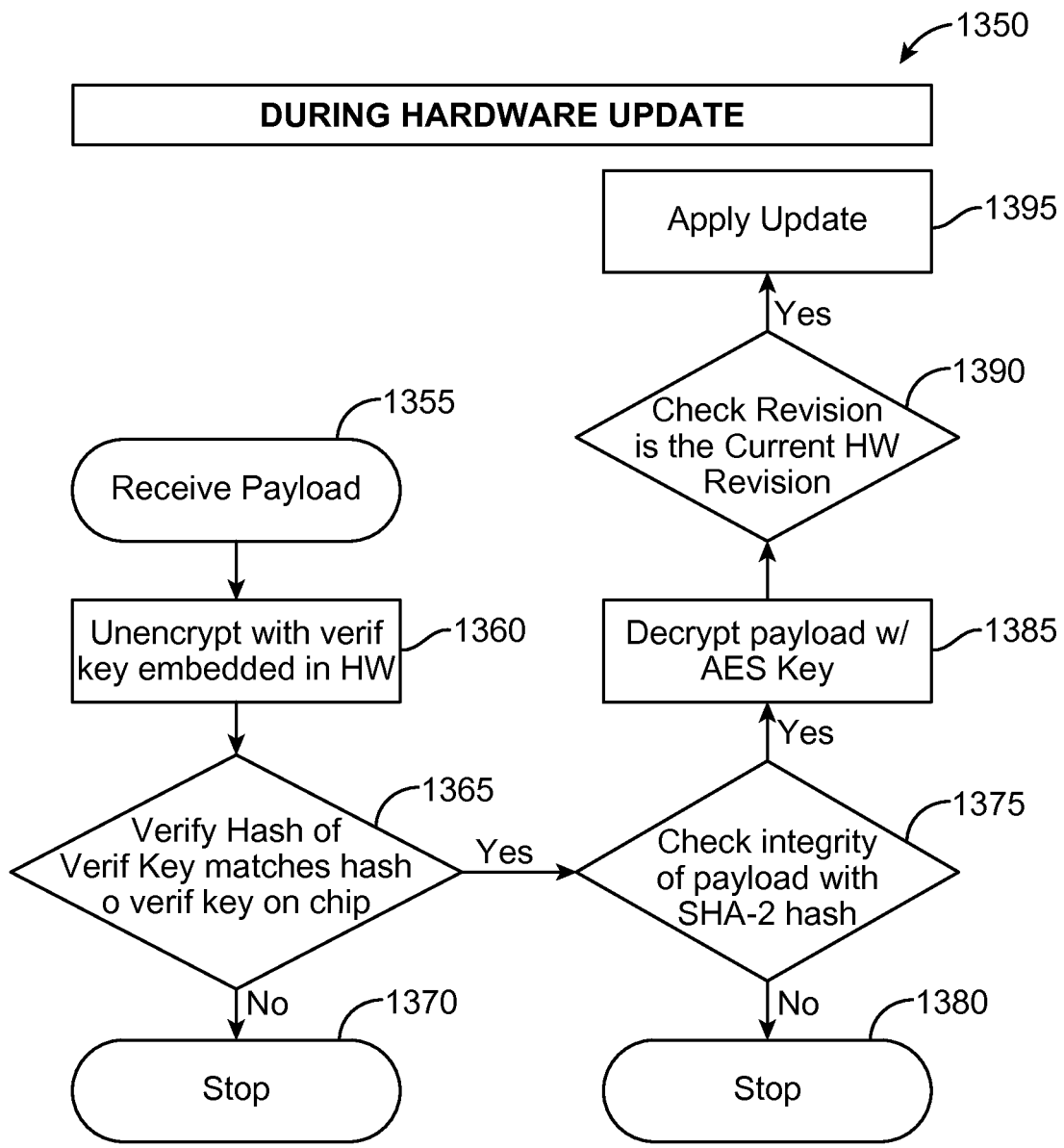
FIG. 13B is a flowchart of an example procedure to receive a security update payload and update the configuration of an AV engine.

Generally, security updates may include one or more of, for example, a classifier, an action program that specifies security policies, a configuration file that determines which performance features are to be used with what classifiers, clean hardware performance data for one or more legitimate processes or programs, and/or an update revision number. This data can be delivered to the AV engine securely using techniques/procedures adapted for a hardware setting. A schematic diagram of an example security update payload 1300 that is to be sent to an antivirus engine, including the various encryption levels applied to the payload, is depicted in FIG. 13A. An example procedure 1350, generally performed by an AV engine, to receive a security update payload (such as the encrypted payload 1300) and update the configuration of the AV engine, is depicted FIG. 13B. As shown in FIG. 13B, the procedure 1350 includes receiving 1355 the payload, and decrypting 1360 the payload with a "verif" key embedded in the hardware (on which the AV engine is implemented). A determination is then made 1365 of whether a resulting hash of the "verif" matches the expected hash of the verif key embedded in the hardware. If it does not, the procedure 1350 terminates 1370. If there is a match of the hash of the "verif" key, a determination is made 1375 of the integrity of the payload with a SHA-2 hash function. If the integrity is confirmed, the payload is decrypted 1385 with an AES key (otherwise, the procedure terminates 1380), and upon a determination that the update revision number indicated in the payload is in agreement with a revision number indicator maintained in the hardware device (at 1390), the updates in the payload are applied 1395.

As indicated in relation to the operation 1390 of the procedure 1350, in some embodiments, the hardware device on which the AV engine is, at least partly, implemented, maintains the revision number of the last update, and that revision number is incremented on every update. This is to prevent/inhibit an attacker from rolling back the AV system, which an attacker might do to prevent the system from discovering new malicious processes. The AV engine may offer this protection by rejecting updates with a revision number that is older than the revision number maintained in the hardware counter.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for unsupervised anomaly-based malware detection using hardware features, the method comprising:
    obtaining current hardware performance data, including hardware performance time-varying counter data, for a hardware device executing a first process associated with recorded hardware performance data representative of the first process' normal behavior;
    identifying a set of hardware performance data from the obtained current hardware performance data based at least on a quantitative measure of how effective one or more features associated with the current hardware performance data can discriminate between hardware performance data obtained during clean execution of a victim process and hardware performance data obtained during infected execution of the victim process, wherein the quantitative measures are computed for both an exploitation stage and a take-over stage of a multi-stage malware infection that hijacks control of the victim process, and wherein the quantitative measures taken at both the exploitation stage and the take-over stage enable the determination of which features are most useful in differentiating clean execution for the victim process from infected execution of the victim process;

aggregating the identified set of hardware performance data;

transforming the aggregated set of hardware performance data based on one or more transform functions, the transforming the aggregated set of hardware performance data comprising deriving a normalized hardware performance value, normalized$_i$, for an event i, from hardware performance data value, raw$_i$ for the event i, according to:

$$\text{normalized}_i = \left(\frac{\text{raw}_i - \text{min}_i}{\text{max}_i}\right)^{\lambda_i}$$

where min$_i$ and max$_i$ are respective minimum and maximum values for the event i, and $\lambda_i$ is a power parameter for the event i;

determining whether an anomalous process is affecting performance of the first process based on a determination of an extent of deviation of the transformed set of hardware performance data corresponding to the first process from the recorded hardware performance data representative of the normal behavior of the first process, wherein the anomalous process is a multi-stage malware infection having an exploitation stage and a take-over stage;

obtaining updates for at least the recorded hardware performance data representative of the normal behavior of the first process, wherein obtaining the updates comprises:

downloading encrypted data for the updates to an antivirus engine in communication with the hardware device providing the current hardware performance data;

decrypting at the antivirus engine the downloaded encrypted data for the updates; and updating a revision counter maintained by the antivirus engine indicating a revision number of a most recent update.

2. The method of claim 1, wherein the hardware performance data is obtained at various time instances and wherein the method further comprises:

performing one or more of a data push operation initiated by the hardware device to send the current hardware performance data, or a data pull operation, initiated by an antivirus engine, to cause the current hardware performance data to be sent by the hardware device.

3. The method of claim 1, wherein identifying the set of hardware performance data comprises:

selecting the one or more features based on respective computed one or more scores representative of the quantitative measure of how effective one or more features associated with the current hardware performance data can discriminate between hardware performance data obtained during clean execution of a victim process and hardware performance data obtained during infected execution of the victim process; and obtaining performance data from the current hardware performance data only for the selected one or more features.

4. The method of claim 3, wherein computing the one or more scores comprises computing one or more Fisher scores.

5. The method of claim 1, wherein determining whether the anomalous process is affecting the performance of the first process comprises:

applying one or more machine-learning procedures, trained using the recorded hardware performance data representative of the normal behavior of the first process, to the transformed set of hardware performance data to determine whether the transformed set of hardware performance data for the hardware device executing the first process deviates from the recorded hardware performance data for the first process.

6. The method of claim 5, wherein the one or more machine learning procedures comprise one or more of: a support vector machine implementing a non-linear radial basis function (RBF) kernel, a k-nearest neighbor procedure, a decision tree procedure, a random forest procedure, an artificial neural network procedure, a tensor density procedure, a Support Vector Machine (SVM), or a hidden Markov model procedure.

7. The method of claim 1, wherein the hardware performance data comprise one or more of: processor load density data, branch prediction performance data, or data regarding instruction cache misses.

8. A system for unsupervised anomaly-based malware detection using hardware features, the system comprising:

a hardware device executing a first process; and an antivirus engine in communication with the hardware device, the antivirus engine configured to:

obtain current hardware performance data, including hardware performance time-varying counter data, for the hardware device executing the first process, the first process associated with recorded hardware performance data representative of the first process' normal behavior;

select one or more features based on respective computed one or more scores representative of a quantitative measure of how effective one or more features associated with the current hardware performance data can discriminate between hardware performance data obtained during clean execution of a victim process and hardware performance data obtained during infected execution of the victim process, wherein the quantitative measures are computed for both an exploitation stage and a take-over stage of a multi-stage malware infection that hijacks control of the victim process, and wherein the quantitative measures taken at both the exploitation stage and the take-over stage enable the determination of which features are most useful in differentiating clean execution for the victim process from infected execution of the victim process;

select performance data from the current hardware performance data only for the selected one or more features;

aggregate the selected hardware performance data according to a sampling duration;

transform the aggregated hardware performance data based on one or more transform functions, the transforming the aggregated hardware performance data comprising deriving a normalized hardware performance value, normalized$_i$, for an event i, from hardware performance data value, raw$_i$ for the event i, according to:

$$\text{normalized}_i = \left(\frac{\text{raw}_i - \text{min}_i}{\text{max}_i}\right)^{\lambda_i}$$

where min$_i$ and max$_i$ are respective minimum and maximum values for the event i, and $\lambda_j$ is a power parameter for the event i;

determine whether an anomalous process is affecting performance of the first process based on a determination of an extent of deviation of the aggregated current hardware performance data corresponding to the first process from the recorded hardware performance data representative of the normal behavior of the first process, wherein the anomalous process is a multi-stage malware infection having an exploitation stage and a take-over stage;

obtain updates for at least the recorded hardware performance data representative of the normal behavior of the first process, wherein obtaining the updates comprises:
  downloading encrypted data for the updates to an antivirus engine in communication with the hardware device providing the current hardware performance data;
  decrypting at the antivirus engine the downloaded encrypted data for the updates; and
  updating a revision counter maintained by the antivirus engine indicating a revision number of a most recent update.

9. The system of claim 8, wherein the antivirus engine configured to determine whether the anomalous process is affecting the performance of the first process is configured to:
  apply one or more machine-learning procedures, trained using the recorded hardware performance data representative of the normal behavior of the first process, to the aggregated current hardware performance data to determine whether the aggregated current hardware performance data for the hardware device executing the first process deviates from the recorded hardware performance data for the first process.

10. The system of claim 9, wherein the one or more machine learning procedures comprise one or more of: a support vector machine implementing a non-linear radial basis function (RBF) kernel, a k-nearest neighbor procedure, a decision tree procedure, a random forest procedure, an artificial neural network procedure, a tensor density procedure, a Support Vector Machine (SVM), or a hidden Markov model procedure.

11. A non-transitory computer readable media storing a set of instructions executable on at least one programmable device that, when executed, causes operations comprising:
  obtaining current hardware performance data, including hardware performance time-varying counter data, for a hardware device executing a first process associated with recorded hardware performance data representative of the first process' normal behavior;
  selecting one or more features based on respective computed one or more scores representative of a quantitative measure of how effective one or more features associated with the current hardware performance data can discriminate between hardware performance data obtained during clean execution of a victim process and hardware performance data obtained during infected execution of the victim process,
    wherein the quantitative measures are computed for both an exploitation stage and a take-over stage of a multi-stage malware infection that hijacks control of the victim process, and
    wherein the quantitative measures taken at both the exploitation stage and the take-over stage enable the determination of which features are most useful in differentiating clean execution for the victim process from infected execution of the victim process;
  obtaining performance data from the current hardware performance data only for the selected one or more features;
  aggregating the current hardware performance data according to a sampling duration;
  transforming the aggregated hardware performance data based on one or more transform functions, the transforming the aggregated hardware performance data comprising deriving a normalized hardware performance value, normalized$_i$, for an event i, from hardware performance data value, raw$_i$, for the event i, according to:

$$\text{normalized}_i = \left(\frac{\text{raw}_i - \text{min}_i}{\text{max}_i}\right)^{\lambda_i}$$

where min$_i$ and max$_i$ are respective minimum and maximum values for the event i, and $\lambda_j$ is a power parameter for the event i;

determining whether an anomalous process is affecting performance of the first process based on a determination of an extent of deviation of the aggregated current hardware performance data corresponding to the first process from the recorded hardware performance data representative of the normal behavior of the first process, wherein the anomalous process is a multi-stage malware infection having an exploitation stage and a take-over stage;

obtaining updates for at least the recorded hardware performance data representative of the normal behavior of the first process, wherein obtaining the updates comprises:
  downloading encrypted data for the updates to an antivirus engine in communication with the hardware device providing the current hardware performance data;
  decrypting at the antivirus engine the downloaded encrypted data for the updates; and
  updating a revision counter maintained by the antivirus engine indicating a revision number of a most recent update.

12. The computer readable media of claim 11, wherein determining whether the anomalous process is affecting the performance of the first process comprises:
  applying one or more machine-learning procedures, trained using the recorded hardware performance data representative of the normal behavior of the first process, to the aggregated current hardware performance data to determine whether the aggregated current hardware performance data for the hardware device executing the first process deviates from the recorded hardware performance data for the first process.

13. An apparatus for unsupervised anomaly-based malware detection using hardware features, the apparatus comprising:

a hardware device executing a first process;

an antivirus engine in communication with the hardware device, the antivirus engine configured to:

obtain current hardware performance data, including hardware performance counter data, for the hardware device executing a first process associated with recorded hardware performance data representative of the first process' normal behavior;

select one or more features based on respective computed one or more scores representative of a quantitative measure of how effective one or more features associated with the current hardware performance data can discriminate between hardware performance data obtained during clean execution of a victim process and hardware performance data obtained during infected execution of the victim process, wherein the quantitative measures are computed for both an exploitation stage and a take-over stage of a multi-stage malware infection that hijacks control of the victim process, and wherein the quantitative measures taken at both the exploitation stage and the take-over stage enable the determination of which features are most useful in differentiating clean execution for the victim process from infected execution of the victim process;

obtain performance data from the current hardware performance data only for the selected one or more features;

aggregate the current hardware performance data according to a sampling duration;

transform the aggregated hardware performance data based on one or more transform functions, the transforming the aggregated hardware performance data comprising deriving a normalized hardware performance value, normalized$_i$ for an event i, from hardware performance data value, raw$_i$, for the event i, according to:

$$\text{normalized}_i = \left(\frac{\text{raw}_i - \text{min}_i}{\text{max}_i}\right)^{\lambda_i}$$

where min$_i$ and max$_i$ are respective minimum and maximum values for the event i, and $\lambda_i$ is a power parameter for the event i;

determine whether an anomalous process is affecting performance of the first process based on a determination of an extent of deviation of the obtained current hardware performance data corresponding to the first process from the recorded hardware performance data representative of the normal behavior of the first process, wherein the anomalous process is a multi-stage malware infection having an exploitation stage and a take-over stage;

obtain updates for at least the recorded hardware performance data representative of the normal behavior of the first process, wherein obtaining the updates comprises:

downloading encrypted data for the updates to the antivirus engine in communication with the hardware device providing the current hardware performance data; and decrypting at the antivirus engine the downloaded encrypted data for the updates.

14. The method of claim 1, wherein the multi-stage malware infection comprises a Return-Oriented Programming ("ROP") and Stage 1 shellcode.

* * * * *